United States Patent
Flosdorf et al.

(10) Patent No.: US 10,303,967 B2
(45) Date of Patent: May 28, 2019

(54) IDENTIFYING ACTIVE AREAS OF INTEREST WITHIN VIDEO DATA

(71) Applicant: LIFESIZE, INC., Austin, TX (US)

(72) Inventors: Stephen Flosdorf, Round Rock, TX (US); Sulanka Goonetilleke, Austin, TX (US)

(73) Assignee: LIFESIZE, INC., Austin, TX (US)

( * ) Notice: Subject to any disclaimer, the term of this patent is extended or adjusted under 35 U.S.C. 154(b) by 0 days.

(21) Appl. No.: 16/056,871

(22) Filed: Aug. 7, 2018

(65) Prior Publication Data

US 2019/0057273 A1    Feb. 21, 2019

Related U.S. Application Data

(60) Provisional application No. 62/548,230, filed on Aug. 21, 2017, provisional application No. 62/565,665, filed on Sep. 29, 2017.

(51) Int. Cl.

| | |
|---|---|
| *H04N 7/15* | (2006.01) |
| *G06K 9/32* | (2006.01) |
| *G06T 7/246* | (2017.01) |
| *G06K 9/20* | (2006.01) |
| *H04N 7/14* | (2006.01) |
| *H04N 5/232* | (2006.01) |

(Continued)

(52) U.S. Cl.
CPC ....... *G06K 9/3233* (2013.01); *G06K 9/00744* (2013.01); *G06K 9/00986* (2013.01); *G06K 9/2054* (2013.01); *G06T 7/13* (2017.01); *G06T 7/246* (2017.01); *G06T 7/90* (2017.01); *H04N 5/23296* (2013.01); *H04N 5/23299* (2018.08); *H04N 7/142* (2013.01); *H04N 7/15* (2013.01); *G06T 1/20* (2013.01); *G06T 2207/10016* (2013.01); *G06T 2207/20024* (2013.01)

(58) Field of Classification Search
CPC ...... G06K 9/32; G06K 9/3233; G06K 9/2054; G06K 9/00986; H04N 7/15; H04N 7/142; H04N 5/23296; H04N 5/23299; G06T 7/246; G06T 7/90; G06T 7/13
USPC ............ 348/14.01–14.16; 382/118, 159, 195
See application file for complete search history.

(56) References Cited

U.S. PATENT DOCUMENTS

| | | |
|---|---|---|
| 8,125,509 B2 | 2/2012 | Kenoyer |
| 8,842,161 B2 | 9/2014 | Feng et al. |

(Continued)

*Primary Examiner* — Melur Ramakrishnaiah
(74) *Attorney, Agent, or Firm* — Anthony M. Petro; Meyertons, Hood, Kivlin, Kowert & Goetzel, P.C.

(57) ABSTRACT

Techniques for detecting an active area of interest within video data are disclosed. A videoconferencing system may include a sensor configured to capture sequential frames of video image data during a videoconference, and a processing subsystem. The processing subsystem may be configured to, for a given frame, apply filter(s) to individual pixels of the given frame to identify one or more pixels of interest within the given frame, where the filter(s) include a motion detection filter. The processing subsystem may further apply a multidimensional filter to the one or more pixels of interest, the multidimensional filter specifying one or more programmable density thresholds. The processing subsystem may further designate at least one group of pixels of interest that satisfies the one or more programmable density thresholds as an active area of interest; and control an aspect of the videoconference based at least in part upon the active area of interest.

20 Claims, 21 Drawing Sheets

(51) Int. Cl.
  *G06T 7/90*   (2017.01)
  *G06K 9/00*   (2006.01)
  *G06T 7/13*   (2017.01)
  *G06T 1/20*   (2006.01)

(56) References Cited

U.S. PATENT DOCUMENTS

| | | |
|---|---|---|
| 2010/0177159 A1 | 7/2010 | Tojo |
| 2011/0243431 A1* | 10/2011 | Sangappa .......... G06K 9/00228 |
| | | 382/164 |
| 2011/0285809 A1 | 11/2011 | Feng et al. |
| 2016/0173824 A1* | 6/2016 | Decker .................. H04N 7/152 |
| | | 348/14.07 |
| 2016/0227163 A1 | 8/2016 | Aarrestad et al. |
| 2017/0237897 A1* | 8/2017 | Sivan .................. H04N 19/597 |
| | | 348/47 |

* cited by examiner

1. A single frame taken after dynamic calibration.

2. The frame is added as the newest entry to a framing stack.

3. The framing stack grows where the oldest fame is removed. This framing stack has height, location and total time its alive.

4. The framing stack now has a "primary frame" that represents the area it has taken in a 2D space.

IDENTIFYING ACTIVE AREAS OF INTEREST WITHIN VIDEO DATA

CROSS-REFERENCE TO RELATED APPLICATIONS

This application claims priority to U.S. Provisional Patent Application Ser. No. 62/548,230, filed Aug. 21, 2017, and U.S. Provisional Patent Application Ser. No. 62/565,665, filed Sep. 29, 2017, each of which is hereby incorporated by reference in its entirety.

BACKGROUND

To a human, video data often contains readily distinguishable types of information, depending on context. For example, in the context of videoconferencing, one's attention may naturally be drawn to the participants, whereas other elements of the scene (e.g., furniture, windows, etc.) may be of secondary importance.

A human camera operator can readily be directed to frame a scene in a manner that reflects the features of interest—e.g., in order to include a person who is currently speaking. Automating such a process presents considerable challenges, however. It is possible to develop feature detection models that analyze a video scene to determine whether expected features are present, such as human faces, and then use such information to determine how to process the scene. Such models tend to be difficult to develop and computationally complex to deploy, potentially increasing system costs.

Embodiments of this disclosure may be used to address the complexities of identifying areas of interest within video data, as well as related issues such as how to address calibration of a system under dynamically changing circumstances.

DETAILED DESCRIPTION OF EMBODIMENTS

Introduction

This disclosure describes various techniques for detecting active areas of interest (AAOIs) within video data in a manner that does not necessarily require computationally complex feature detection models. First, an example videoconferencing system is described in which such techniques may be employed, it being noted that this disclosure is not limited to videoconferencing applications. Next, particular embodiments of a subsystem for detection of active areas of interest are discussed. Techniques for dynamically calibrating such a subsystem (e.g., to account for changing conditions, such as changes in lighting) are then discussed. The final section of this disclosure describes techniques for constructing a topological map using AAOI data in order to control the presentation of video data (e.g., by automatically adjusting the framing of a scene during a videoconference).

Example Videoconferencing System

The various techniques described herein may be applied within the context of a videoconferencing system, although they may also find applicability within a wide variety of other systems for processing video or image data. The following discussion describes how a videoconferencing system may be organized and the various components it may include. It is noted that where video processing elements are described (e.g., the codec discussed below), such elements may be implemented using a general-purpose computer, a dedicated peripheral device (e.g., a device containing an embedded processor having functionality that is generally fixed), or a combination of general-purpose and customized hardware and/or software. It is further noted that virtualized or decentralized computing platforms (e.g., cloud-based computing resources) may be employed to implement many of the processing elements of a videoconferencing system.

Figure 1:
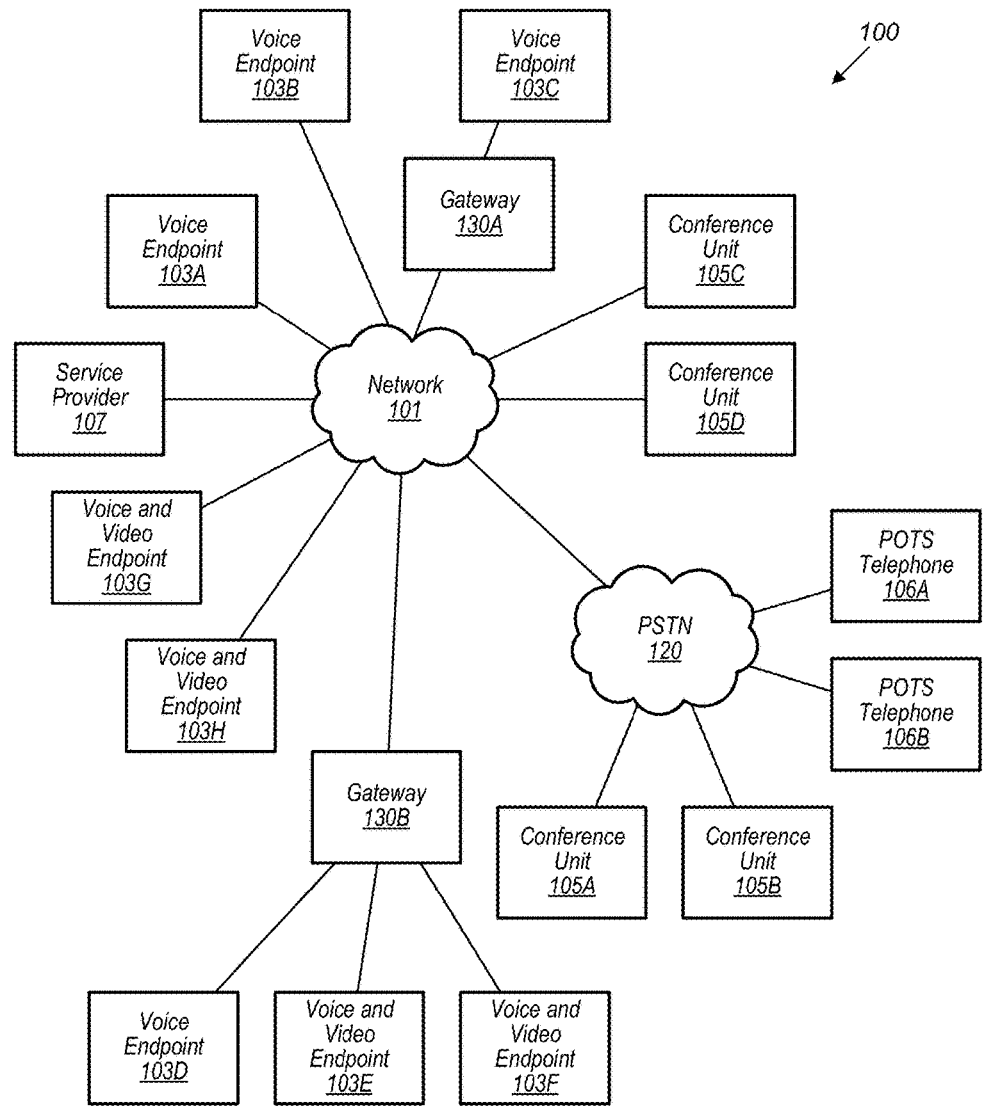
FIG. 1 is a block diagram illustrating an embodiment of a videoconferencing system.

FIG. 1 illustrates an embodiment of a videoconferencing system 100. Video conferencing system 100 comprises a plurality of participant locations or endpoints. FIG. 1 illustrates an embodiment of a videoconferencing system 100 which may include a network 101, endpoints 103A-103H (e.g., audio and/or video conferencing systems), gateways 130A-130B, a service provider 107 (e.g., a multipoint control unit (MCU)), a public switched telephone network (PSTN) 120, conference units 105A-105D, and plain old telephone system (POTS) telephones 106A-106B. Endpoints 103C and 103D-103H may be coupled to network 101 via gateways 130A and 130B, respectively, and gateways 130A and 130B may each include firewall, network address translation (NAT), packet filter, and/or proxy mechanisms, among others. Conference units 105A-105B and POTS telephones 106A-106B may be coupled to network 101 via PSTN 120. In some embodiments, conference units 105A-105B may each be coupled to PSTN 120 via an Integrated Services Digital Network (ISDN) connection or other digital telephony connections (e.g., Digital Subscriber Line (DSL)), and each may include and/or implement H.320 capabilities. In various embodiments, video and audio conferencing may be implemented over various types of networked devices.

In some embodiments, endpoints 103A-103H, gateways 130A-130B, conference units 105C-105D, and service provider 107 may each include various wireless or wired communication devices that implement various types of communication, such as wired Ethernet, wireless Ethernet (e.g., IEEE 802.11), IEEE 802.16, paging logic, RF (radio frequency) communication logic, a modem, a digital subscriber line (DSL) device, a cable (television) modem, an ISDN or DSL device, an ATM (asynchronous transfer mode) device, a satellite transceiver device, a parallel or serial port bus interface, and/or other type of communication device or method.

In various embodiments, the methods and/or systems described may be used to implement connectivity between or among two or more participant locations or endpoints, each having voice and/or video devices (e.g., endpoints 103A-103H, conference units 105A-105D, POTS telephones 106A-106B, etc.) that communicate through various networks (e.g., network 101, PSTN 120, the Internet, etc.).

Endpoints 103A-103C may include voice conferencing capabilities and include or be coupled to various audio devices (e.g., microphones, audio input devices, speakers, audio output devices, telephones, speaker telephones, etc.). Endpoints 103D-103H may include voice and video communications capabilities (e.g., video conferencing capabilities) and include or be coupled to various audio devices (e.g., microphones, audio input devices, speakers, audio output devices, telephones, speaker telephones, etc.) and include or be coupled to various video devices (e.g., monitors, projectors, displays, televisions, video output devices, video input devices, cameras, etc.). In some embodiments, endpoints 103A-103H may comprise various ports for coupling to one or more devices (e.g., audio devices, video devices, etc.) and/or to one or more networks.

Conference units 105A-105D may include voice and/or video conferencing capabilities and include or be coupled to various audio devices (e.g., microphones, audio input devices, speakers, audio output devices, telephones, speaker telephones, etc.) and/or include or be coupled to various video devices (e.g., monitors, projectors, displays, televisions, video output devices, video input devices, cameras, etc.). In some embodiments, endpoints 103A-103H and/or conference units 105A-105D may include and/or implement various network media communication capabilities. For example, endpoints 103A-103H and/or conference units 105C-105D may each include and/or implement one or more real time protocols, e.g., session initiation protocol (SIP), H.261, H.263, H.264, H.323, among others. In some embodiments, endpoints 103A-103H may implement H.264 encoding for high definition video streams.

In various embodiments, a codec may implement a real time transmission protocol. In some embodiments, a codec (which may be short for "compressor/decompressor") may comprise any system and/or method for encoding and/or decoding (e.g., compressing and decompressing) data (e.g., audio and/or video data). For example, communication applications may use codecs to convert an analog signal to a digital signal for transmitting over various digital networks (e.g., network 101, PSTN 120, the Internet, etc.) and to convert a received digital signal to an analog signal. In various embodiments, codecs may be implemented in software, hardware, or a combination of both. Some codecs for computer video and/or audio may include Moving Picture Experts Group (MPEG), Indeo, and Cinepak, among others.

In some embodiments, at least one of the participant locations may include a camera for acquiring high resolution or high definition (e.g., HDTV compatible) signals. At least one of the participant locations may include a high definition display (e.g., an HDTV display), for displaying received video signals in a high definition format. In various embodiments, the bandwidth of network 101 may vary from relatively low (e.g., on the order of 1.5 Mbit/s or less) to relatively high (hundreds or thousands of Mbit/s).

In some embodiments, the video conferencing system may support high definition capabilities. The term "high resolution" includes displays with resolution of 1280×720 pixels and higher. In one embodiment, high-definition resolution may comprise 1280×720 progressive scan at 60 frames per second, or 1920×1080 interlaced or 1920×1080 progressive. Thus, in one embodiment, a video conferencing system may support high definition "e.g. similar to HDTV" display capabilities using network infrastructures with bandwidths T1 capability or less. The term "high-definition" is intended to have the full breath of its ordinary meaning and includes "high resolution." It is noted that higher resolutions than those discussed here are possible and contemplated.

Figure 2:
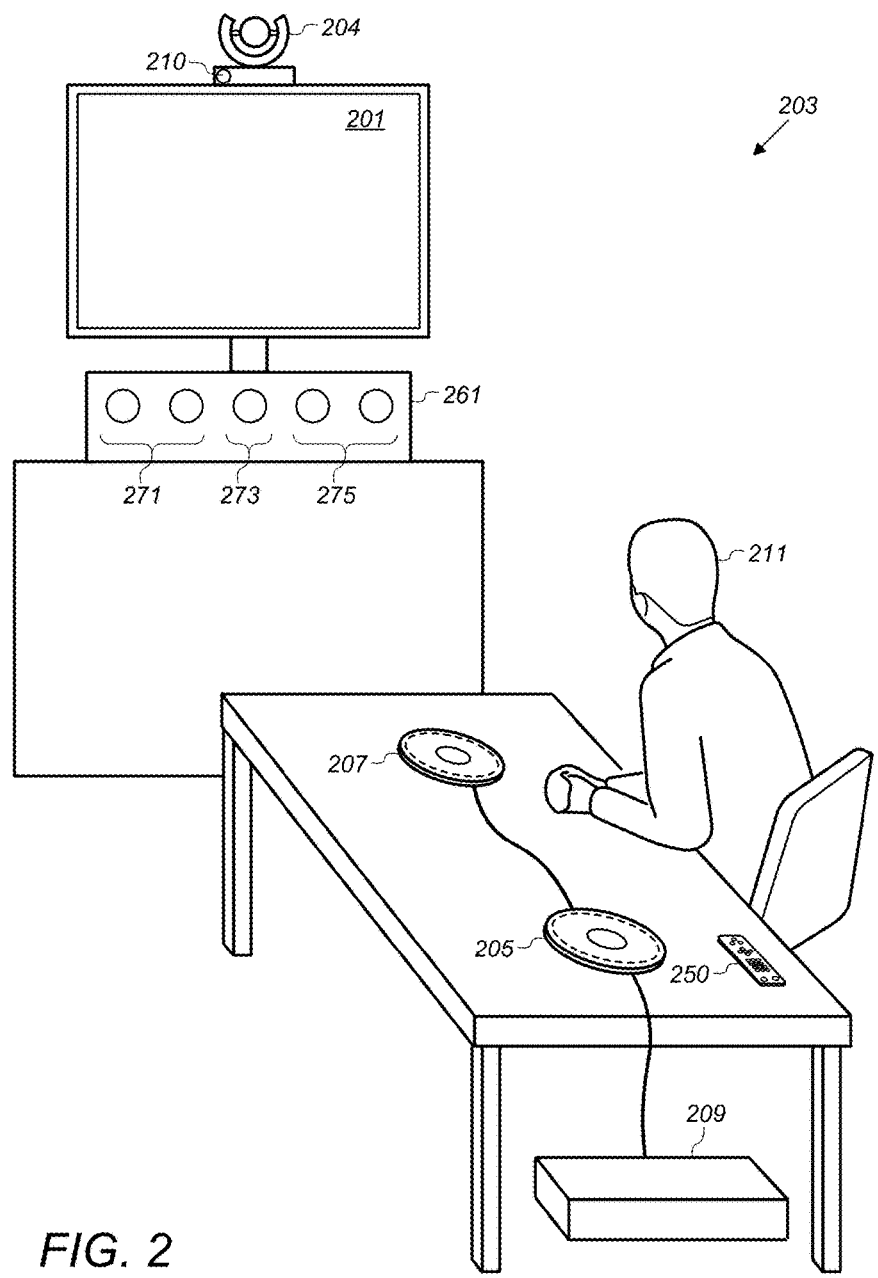
FIG. 2 is a block diagram illustrating elements of a videoconferencing system as they may appear at a particular participant location.

FIG. 2 illustrates an embodiment of elements of video-conferencing system 100 as they may appear at a particular participant location. Collectively, those elements of video-conferencing system 100 present at the participant location as shown in FIG. 2 may be referred to as video conferencing system 203 (and may alternatively be referred to as an endpoint or conferencing unit. In some embodiments, the video conference system 203 may have a system codec 209 to manage a speakerphone 205/207 and other elements of video conferencing system 203. For example, a speakerphone 205/207 and other elements of video conferencing system 203 may be coupled to the integrated video and audio conferencing system codec 209 and may receive audio and/or video signals from the system codec 209. In some embodiments, speakerphones 205/207 may be daisy chained together.

In some embodiments, the speakerphone 205/207 may be a high quality speakerphone. For example, in some embodiments, 16 microphones may be radially distributed around a center speaker. Other numbers of microphones and speakers may also be used. The microphones may be radially distributed to enhance detection of an in-room participant's voice from multiple angles relative to the speakerphone 205/207.

In some embodiments, the participant location may include a high definition camera 204 for acquiring high definition images of the participant location. As discussed in greater detail below, camera 204 may be a main view camera having controllable aspects (e.g., controllable pan, tilt, and/or zoom characteristics). Camera 204 may include a framing camera 210, which may collect video information that can be used to control camera 204. While framing camera 210 may be integrated within camera 204 as shown, in other embodiments framing camera 210 may also be implemented as a separate device.

The participant location may also include a high definition display 201 (e.g., a HDTV display). High definition images acquired by the camera may be displayed locally on the display and may also be encoded and transmitted to other participant locations in the videoconference. In some embodiments, data from camera may be provided to the video conferencing system through a digital link from the camera. The data may be processed external to the camera (e.g., with the logic of the system codec 209). In some embodiments, the data may be processed inside the camera.

The participant location may also include a sound system 261. The sound system 261 may include multiple speakers including left speakers 271, center speaker 273, and right speakers 275. Other numbers of speakers and other speaker configurations may also be used.

The video conferencing system components (e.g., the camera 204, display 201, sound system 261, and speakerphones 205/207) may be coupled to a system codec 209. The system codec 209 may receive audio and/or video data from a network. The system codec 209 may send the audio to the speakerphone 205/207 and/or sound system 261 and the video to the display 201. The received video may be high definition video that is displayed on the high definition display. The system codec 209 may also receive video data from the camera 204 and audio data from the speakerphones 205/207 and transmit the video and/or audio data over the network to another conferencing system. In some embodiments, the conferencing system may be controlled by a participant 211 through the user input components (e.g., buttons) on the speakerphone 205/207 and/or remote control 250. Other system interfaces may also be used. Moreover, it is noted that in various embodiments, some or all of the functionality of codec 209 may be implemented by or integrated within other system components (e.g., within camera 204) and/or deployed remotely (e.g., within cloud-based computing resources).

Detection of Active Areas of Interest

This section describes embodiments of a procedure and possible set of data and statistics derived from video frames that can be used for locating an active area of interest within a camera's Field Of View (FOV). For the application of video conferencing, the Active Area Of Interest (AAOI) is here defined to be generally the region of the video frame where the people are, but may be extended to include other elements within the scene. However, other applications may be envisioned, such as locating moving cars by a traffic camera, tracking sports players within a video frame, or performing other types of video production or processing. The definition of what constitutes an AAOI may vary based on the context of a particular application. Along with this data set description is one possible method of implementation. Although this method can be implemented in software using general purpose hardware (e.g., a general purpose microprocessor), it is particularly well suited for application specific hardware such as a field programmable gate array or other programmable or custom-designed circuitry, since it relies on simple mathematical and logical structures.

Generally speaking, the method of AAOI detection discussed here involves finding areas of motion within the FOV, and then optionally filtering the areas of motion with more filtering. Such additional filtering may involve filtering by color, such as performing skin tone detection or selecting a different color or palette of colors (e.g., based on the colors of relevant objects within the FOV). A Pixel Of Interest, or POI, is generally defined to be a pixel that has passed at least a motion detection filter, although in some embodiments, multiple filters (including skin tone filters, other color filters, or filters based on other types of properties such as, e.g., luminance) may be applied to individual pixels of a given frame to identify pixels of interest. In general, the logical AND of multiple filters being passed will be most useful, but it may also prove useful to occasionally gather statistics from frames for either motion detection only or another filter such as skin-tone only. Skin-tone only filtering can present challenges, because there are many objects with skin tone that are inanimate (e.g., conference room doors, tabletops, etc.). Motion detection is more powerful, but can also present challenges in isolation, since it includes things like trees swaying in the wind through a window, long cast shadows, reflections, etc.

After filtering for motion detection (and, possibly, applying other types of pixel-level filters) to identify POI, secondary filtering can be applied. Generally speaking, in contrast to the pixel-level filtering used to identify POI, the secondary filtering may involve the use of multidimensional filters that, when applied to a particular pixel, take into account multiple other pixels (such as neighboring pixels). One example of such a multidimensional filter includes a two-dimensional running-sum low pass filter (e.g., a set of moving average filters whose outputs are multiplied by the length of the filter kernel). Programmable density thresholds for the multidimensional filters can be applied in order to locate areas of the frame that contain predefined densities of POI. The results can then be passed through edge detection logic that locates the furthest Top/Bottom/Left/Right edges of all the Pixels Of Interest within the total FOV. In this way, coordinates for the entire AAOI can be provided. As will be seen, it is also possible and perhaps desirable to find multiple sub-AAOI within the overall AAOI.

Figure 3:
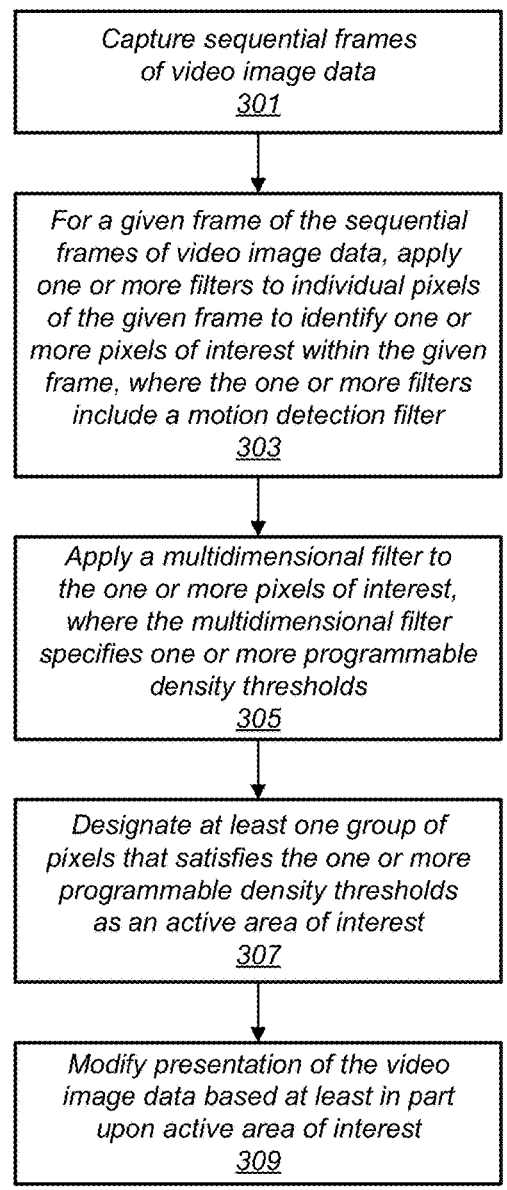
FIG. 3 is a flow diagram illustrating an embodiment of determining an active area of interest (AAOI) of a video frame.

One embodiment of a method of determining an AAOI of a video frame is shown in FIG. 3. In the illustrated embodiment, the method proceeds as follows:

Capture sequential frames of video image data (block 301). For example, a sensor within a camera may be employed to capture frames of video data during a videoconference, or in another video processing context.

For a given frame of the sequential frames of video image data, apply one or more filters to individual pixels of the given frame to identify one or more pixels of interest within the given frame (block 303). In one embodiment, the one or more filters includes a motion detection filter, while in other embodiments, the one or more filters may include one or more of: a skin-tone detection filter, a color detection filter, an intensity or luminance filter, or any combination of these. Additionally, for various types of filters, applying a filter to an individual pixel may be performed based on attributes of the individual pixel alone, or in combination with any number of pixels neighboring the individual pixel in space (e.g., within a frame), in time (e.g., in successive or previous frames), or any suitable combination thereof.

Apply a multidimensional filter to the one or more pixels of interest, where the multidimensional filter specifies one or more programmable density thresholds (block 305). In some embodiments, the multidimensional filter may include a two-dimensional running-sum low pass filter.

Designate at least one group of pixels that satisfies the one or more programmable density thresholds as an active area of interest (block 307). Generally speaking, each individual group of POI within the frame that passes the relevant thresholds may be designated as falling within an AAOI.

Modify presentation of the video image data based at least in part upon the active area of interest (block 309). In some embodiments, once an AAOI has been designated, it may be used to control an aspect of the manner in which video data is captured or displayed. For example, in the context of a videoconference, AAOI information may be used to adjust framing of the videoconference within a camera, such as by controlling one or more of pan, tilt, or zoom operations of the camera to cause the AAOI to appear within the field of view of the camera. In some embodiments, multiple cameras may be used. For example, a framing camera may be used to capture the frames of video image data on which AAOI detection is performed, and the resultant AAOI information may be used to control a separate main view camera that is used to generate the video actually displayed to users (e.g., videoconference participants). The framing camera and main view camera may have different technical properties; for example, the framing camera may employ lower resolution than the main view camera, and/or the framing camera may have a larger field of view than the main view camera.

As previously noted, AAOI detection may be employed to detect features of interest in contexts other than videoconferencing. For example, it can be used to detect objects within video data, such as cars, people, etc. Once an AAOI has been detected, in some embodiments, modifying the presentation of the video image data based at least on part on the AAOI may include visually identifying the AAOI within the video image data. For example, a bounding box corresponding to the AAOI may be displayed, or the AAOI may be otherwise distinguished or highlighted within the video image data.

AAOI information may also be used for various types of downstream processing of the video data, such as shape or feature detection. As noted below, in some embodiments, AAOI information from one video frame may be used to assist AAOI identification in a successive video frame.

In some embodiments, designating at least one group of POI as an AAOI is performed by generating bounding coordinates of the AAOI within the given frame. For example, the application of the multidimensional filter may result in the detection of multiple discrete AAOIs, each having respective bounding coordinates (which may be determined, e.g., by locating the edges of the respective AAOI within the frame). A single, global AAOI may then be determined by identifying the bounding coordinates of a region (e.g., a rectangle, although other shapes may also be employed) that encompasses the multiple AAOI.

In some embodiments, the bounding coordinates and/or edge information of individual AAOIs may be output along with the bounding coordinates of the global AAOI that encompasses all the detected AAOIs, which may improve processing granularity for downstream processes. In other cases, the bounding coordinates of individual AAOIs may be discarded once the coordinates of the global AAOI are determined. In fact, in some implementations, bounding coordinates for individual AAOIs may not be determined. Instead, starting from an individual AAOI, the edges of the global AAOI may be successively broadened to encompass all of the detected AAOIs without necessarily identifying or retaining bounding coordinates for the individual AAOIs.

It is noted that the general procedure for AAOI detection here may be characterized as a "bottom up" approach, in that it begins with pixel-level analysis (e.g., small regions of pixels, potentially from multiple frames) and proceeds to synthesize AAOI information from this basic unit of image data. This is in contrast to a "top down" approach, which may involve, e.g., performing face or feature detection in order to identify which portions of a video frame are the most relevant in a given context. "Top down" approaches may be computationally expensive, because feature detection is a difficult problem and corresponding algorithms tend to be complex. By contrast, the regularity and symmetry of "bottom up" approach described herein may lend itself to parallelization, which in turn may enable it to scale well on hardware with significant parallel execution resources. The approach described here may also be particularly suitable for implementation on the hardware level where pixels are received in a streaming, sequential manner, and local "pools" or groups of pixels can be stored and utilized, in contrast to relying on one or more entire frames of video being stored in a large external memory.

The AAOI detection process described above may be implemented via a general-purpose processor or a graphics processor that implements an instruction set architecture (ISA), where the general-purpose processor or graphics processor is configured to implement the various filters discussed above (e.g., the pixel-level filters and the multi-dimensional filter) by executing instructions selected from the ISA. However, as discussed in greater detail below, the process may also be implemented by a special-purpose video processing circuit that includes an image processing pipeline that is configured to implement the various filters. For example, a special-purpose video processing circuit implemented in a field programmable gate array (FPGA), an application specific integrated circuit (ASIC), or another type of programmable logic or special-purpose circuit may provide higher processing performance, lower power consumption, or a combination of these relative to a software implementation via an ISA. For example, special-purpose circuit implementations may be designed to specifically provide parallel/concurrent execution resources tailored to the pixel-level processing presented by the "bottom up" approach, as discussed above.

Furthermore (but optional and auxiliary to the above procedure), statistics for the number of pixels that pass these filtering stages can be gathered and organized such that the entire FOV is broken up into a matrix of smaller boxes where for each box, a count of the number of POI is logged on a video frame by video frame basis. Such auxiliary statistics may prove useful to the more primary procedure of finding the boundary coordinates of each AAOI as described above. An example of such statistics is discussed in greater detail below.

Figure 4:
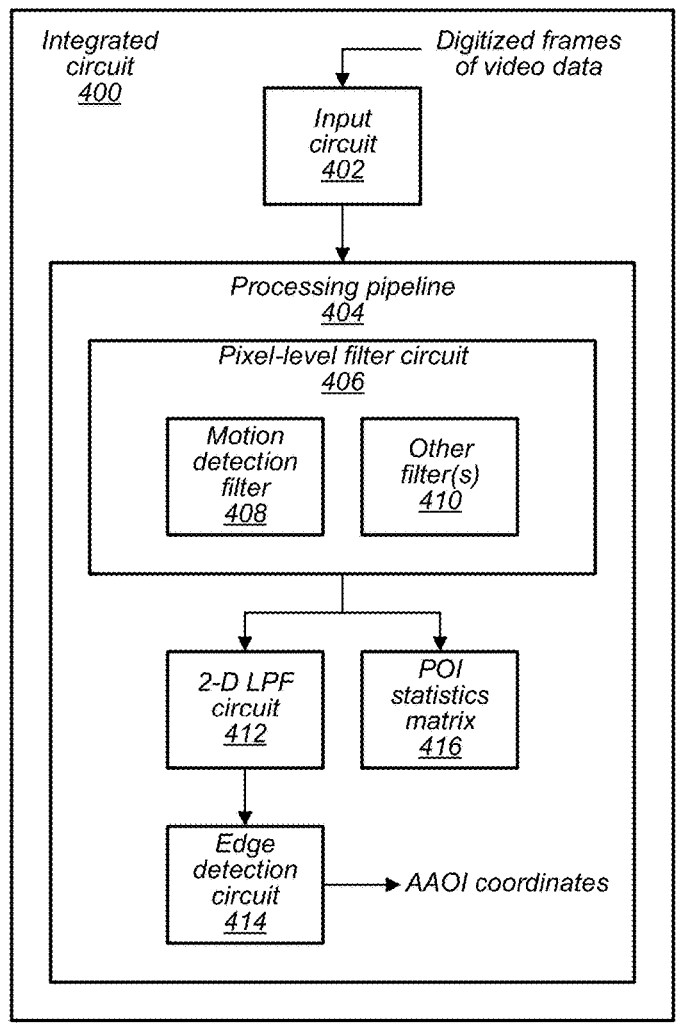
FIG. 4 is a block diagram illustrating an embodiment of a hardware implementation for AAOI detection.

An embodiment of a hardware implementation for performing AAOI detection is shown in FIG. 4. In the illustrated embodiment, integrated circuit 400 includes an input circuit 402 coupled to a processing pipeline 404. Processing pipeline 404 includes a pixel-level filter circuit 406, which in turn includes a motion detection filter 408 as well as one or more other filter(s) 410. The output of pixel-level filter circuit 406 is coupled to a two-dimensional low-pass filter (2-D LPF) circuit 412 as well as a point of interest statistics matrix 416. The output of filter circuit 412 is coupled to edge detection circuit 414.

Preliminarily, as noted above, integrated circuit 400 may be implemented in a variety of ways. For example, the elements of integrated circuit 400 could be defined within a programmable FPGA, or designed as custom logic circuits within an ASIC. In other embodiments, it is possible to implement the features of integrated circuit 400 entirely within software executable on a general-purpose processor or a graphics processing unit (GPU). As shown in FIG. 4, it is noted that each of the blocks represents a particular circuit that is designed to perform a specific type of operation within the pipeline, the results of which may be passed to successive pipeline stages for further processing. That is, each of the blocks may be implemented as a collection of transistors, gates, or other devices arranged to perform the operations corresponding to that portion of the pipeline.

Input circuit 402 may be configured to receive digitized frames of video data. This data may be received from any suitable source, whether live or recorded. A given one of the frames of video data may include a two-dimensional array of pixels. In some embodiments, input circuit 402 may include interface logic, buffers, or other supporting circuitry for ensuring an orderly flow of data for subsequent processing by pipeline 404.

Pipeline 404 may be configured to operate on the frames of data received by input circuit 402. Processing within pipeline 404 begins with pixel-level filter circuit 406, which may be configured to apply one or more filters to individual pixels of a given frame of video data. As shown in FIG. 4, the filters include motion detection filter 408 and may include other filters 410, each of which may correspond to a pixel-level filter. Example of other filters 410 include, but are not limited to, skin-tone detection filters, color detection filters, and intensity filters. Examples of techniques for performing local area motion detection may be found in U.S. Pat. Nos. 8,311,129 and 8,437,505, each of which is hereby incorporated by reference herein in its entirety. An example method for skin tone detection may be found in U.S. Pat. No. 7,864,221, which is hereby incorporated by reference herein in its entirety. (To the extent that any matter incorporated by reference is inconsistent with this disclosure, it is intended that this disclosure control.)

POI statistics matrix 416 is a collection of pixel-level statistics that may include, e.g., POI counts within sub-areas of a video frame. This matrix of statistics is auxiliary information that could be useful, but as previously mentioned, is not essential to the AAOI method discussed here. An example of the pixel statistics matrix is discussed below with respect to FIG. 5.

As discussed previously, the process of determining the actual coordinate limits or boundaries of an AAOI within video frames involves application of a multidimensional filter, shown in FIG. 4 as 2-D LPF circuit 412. As discussed in greater detail below with respect to FIG. 6, 2-D LPF circuit 412 may be configured to identify pixels of interest (e.g., as output from pixel-level filter circuit 406) that satisfy one or more programmable density thresholds.

Edge detection circuit 414 may be configured to generate coordinates of an AAOI within a given frame of video data, where the AAOI bounds the pixels of interest that satisfy the one or more programmable density thresholds applied by 2-D LPF circuit 412. An embodiment of edge detection circuit 414 is discussed in greater detail below with respect to FIG. 8.

Table 1 below defines a number of acronyms and abbreviations that will be used in the rest of this document:

TABLE 1

Definitions of Acronyms and Abbreviations in this document.

| Acronym or Abbreviation | Full Name | Description |
|---|---|---|
| Flag | Flag | A single bit logic value set to 1 indicating 'True', or 0 indicating 'False'. |
| AAOI | Active Area Of Interest | In a videoconferencing context, this is an area within the camera video FOV that has been identified as being the area that encompasses all people present. It could also be extended to include other objects in the room. For example, if only motion detection were being used, then it could include the area that encompasses all movement within the scene (e.g., perhaps someone is using a pointer to a blackboard). In other contexts and applications, the AAOI may have a different interpretation. |
| POI | Pixel Of Interest | This is a pixel that has been singled out through application of one or more filters or processing logic. It is therefore marked as interesting or special so that it can be identified for further processing, or simply counted, for the purpose of generating video data statistics needed to help identify one or more AAOI within video frames. |
| POI_Flag | Pixel Of Interest Flag | This is a per pixel location (location within a video frame) flag that identifies a POI. |
| LPF | Low-Pass Filter | This normally refers to any general Low Pass Filter, such as the running-sum LPF discussed below. An n-bit LPF refers to a LPF whose sample length is some integer, n. |
| HLPF | Horizontal LPF | This is an n-bit LPF that works on each line of video data, where for each pixel location within a video line, it takes as an input the POI_Flag. The filter is applied over the current position POI_Flag plus the n-1 previous and closest position POI_Flags of the current line. |
| HLPF_Flag | HLPF Flag | This is a per pixel location flag output by the HLPF. For each pixel location, if the filter satisfies some programmable threshold, then this flag is set to 1, otherwise it is set to 0. |
| VLPF | Vertical LPF | This is an n-bit (possibly different length, n, than that for the HLPF) LPF, where for each pixel location, it takes as input the HLPF_Flag. The filter is applied over the current position HLPF_Flag plus the n-1 POI_Flags with the same horizontal position of the current pixel location for the previous n-1 video lines. |

TABLE 1-continued

Definitions of Acronyms and Abbreviations in this document.

| Acronym or Abbreviation | Full Name | Description |
|---|---|---|
| POI_2D_Zone | 2-Dimensional POI Zone Flag. | This is a per pixel location flag output by the VLPF. For each pixel location, if the filter satisfies some programmable threshold, then this flag is set to 1, otherwise it is set to 0. When this flag is true, it indicates that the current pixel location being processed is within the bounds of 1 or more AAOI. |

Figure 5:
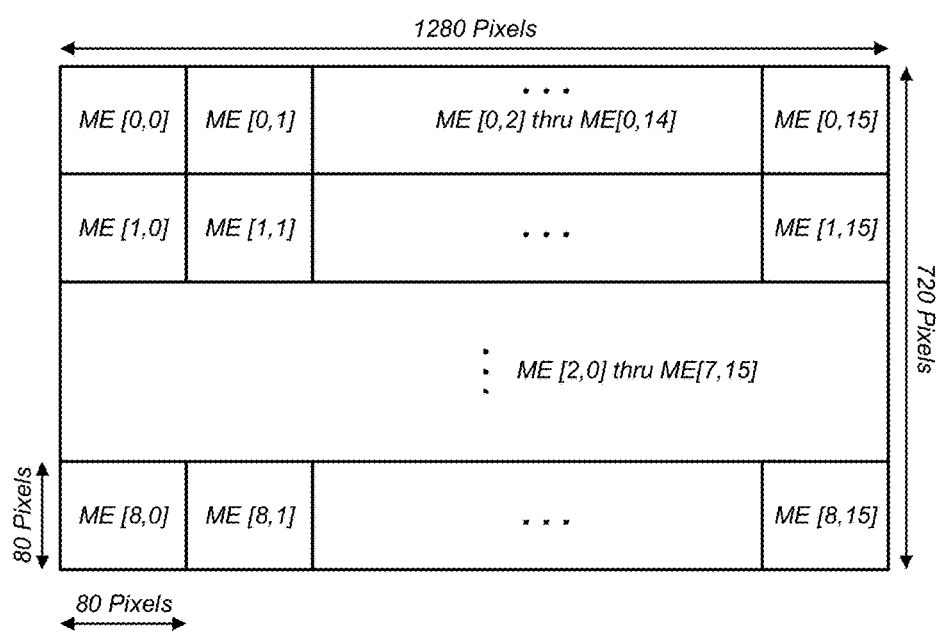
FIG. 5 is a block diagram illustrating an embodiment of a pixel-of-interest statistics matrix.

FIG. 5 illustrates an embodiment of POI statistics matrix 416 for a video frame format of 1280×720. The area is sub-divided into a matrix of 9 rows by 16 columns, where each matrix element corresponds to a sub-area of the video frame that is 80 pixels wide by 80 pixels high. A matrix element is denoted by ME[i, j], where index 'i' is the row coordinate and index 'i' is the column coordinate of the matrix element. For each ME[i, j], there is a count of POI that have been detected within that portion of the video frame, and therefore, for any given video frame, 16×9=144 POI counts could be collected. It is noted that the video frame format and the particular dimensions of the matrix are merely an example, and that any suitable variations may be employed. Additionally, structures other than a matrix may be employed, and statistics may be gathered over arbitrary areas rather than uniform tilings of the frame space. Moreover, other statistics may be stored in addition to or instead of POI counts, such as measures of intensity/brightness as an example. It is noted that POI statistics matrix 416 may be implemented as a dedicated storage structure within integrated circuit 400 (e.g., using RAM cells, registers, or any other suitable storage circuit), or, alternatively, implemented in memory external to integrated circuit 400.

These POI counts within video frame sub-areas could be useful for providing more information as to the location and or significance of multiple AAOI contained within an overall global AAOI. As more matrix elements are used, the granularity of this type of information increases.

Figure 6:
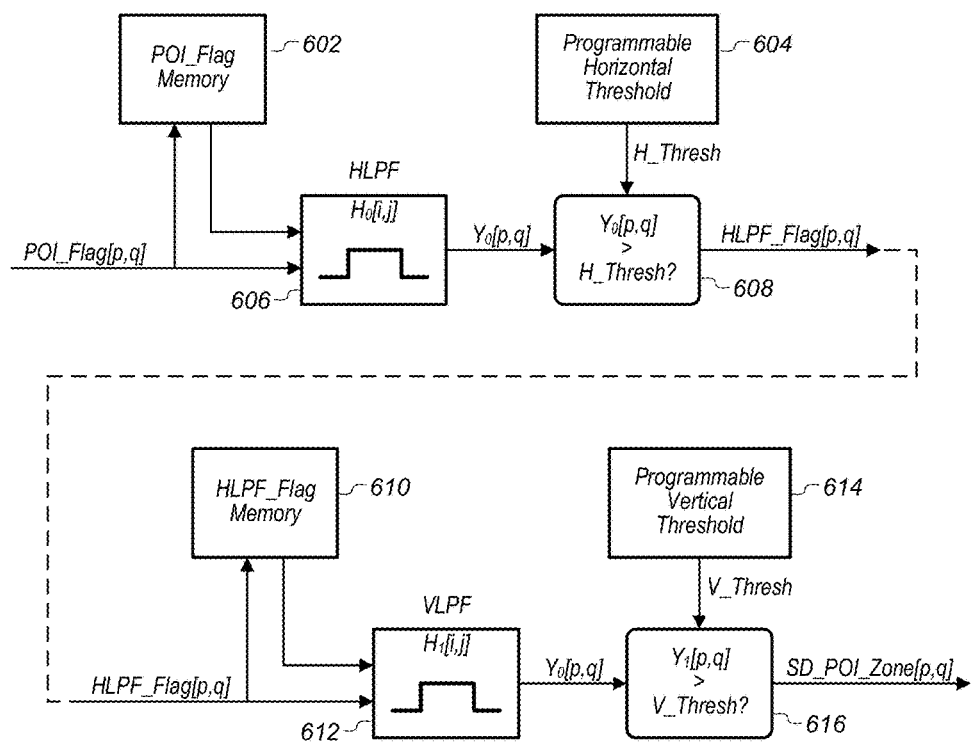
FIG. 6 is a block diagram illustrating an embodiment of a two-dimensional low pass filter circuit.

One possible method of determining the bounding coordinates for an AAOI is to pass the POI_Flags through 2 stages of running sum LPFs. FIG. 6 illustrates one possible organization of 2-D LPF circuit 412 in this fashion.

Figure 7:
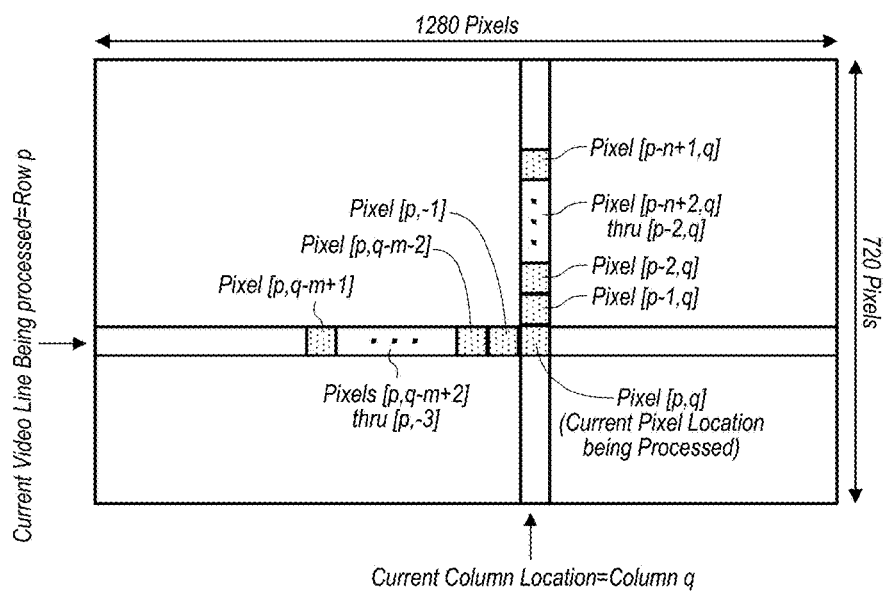
FIG. 7 illustrates an example of a two-dimensional pixel addressing scheme within a video frame.

Prior to discussing the operation of 2-D LPF circuit 412, a frame of reference for pixel coordinates (using an example frame size of 1280×720) is provided in FIG. 7, which will serve as the basis for this discussion. FIG. 7 illustrates a 2-dimensional pixel addressing scheme in which the indices are integers >=0 and the uppermost leftmost pixel has coordinates [0,0] (although other addressing schemes are possible). As shown, when processing a given pixel [p, q] (i.e., in row p and column q of the frame), m pixels to the left of the given pixel and n pixels above the pixel may be employed, as described below. Moreover, in some embodiments, for pixels that are within m or n pixels from the left or top edge of the frame, respectively, only the actual neighboring pixels may be used. Alternatively, these boundary-zone pixels may be ignored entirely in the multidimensional filtering process.

With the frame of reference shown in FIG. 7, the POI_Flag running sum shown in FIG. 6 can be defined by the following equations:

$$H_0[i, j] = \begin{cases} 1, & \text{for } i = p \text{ and } j = q, q-1, q-2, \ldots, q-m+1 \\ 0, & \text{otherwise} \end{cases}.$$

Generally speaking, applying the horizontal LPF to calculate $Y_0$ involves convolving the POI_Flag inputs with $H_0$, but this can be reduced to a simple sum of bits:

$$Y_0[p, q] = \sum_{j=0}^{m-1} \text{POI\_Flag}[p, q-j].$$

Similarly, the HLPF_Flag running sum can be defined by the next 2 equations:

$$H_1[i, j] = \begin{cases} 1, & \text{for } i = p, p-1, p-2, \ldots, p-n+1 \text{ and } j = q \\ 0, & \text{otherwise} \end{cases}.$$

$$Y_1[p, q] = \sum_{i=0}^{n-1} \text{HLPF\_Flag}[p-i, q].$$

Described in words, using the POI_Flags, the $1^{st}$ stage looks for groups of POI horizontally within video lines, and for each pixel location, outputs the HLPF_Flag. If the running sum count of POI_Flags is greater than some programmable horizontal threshold, then the result is considered to be significant enough to pass into the $2^{nd}$ stage filter. The HLPF_Flag of the $1^{st}$ stage can be viewed as defining pixel locations that reside within 1-D horizontal POI zones. With reference to FIG. 6, application of the HLPF is shown in block 606, and application of programmable horizontal threshold 604 is shown in block 608. As shown, the values of POI_Flag may be stored in memory 602 during operation.

Using the HLPF_Flags, the $2^{nd}$ stage (i.e., the vertical LPF) looks for groups of 1-D horizontal POI zones vertically within video columns. For each pixel location, if the running sum count of HLPF_Flags is greater than some programmable vertical threshold, then the result is considered to be significant enough such that the pixel location is considered to be within a POI_2D_Zone. In other words, that pixel location is considered to be situated within a 2-D POI zone, or equivalently, an AAOI. In FIG. 6, application of the VLPF is shown in block 612, and application of programmable vertical threshold 614 is shown in block 616.

As shown, the values of HLPF_Flag may be stored in memory 610 during operation.

The horizontal and vertical thresholds employed by the LPFs described above may be statically or dynamically determined. In some embodiments, they may be programmed by software as a result of performing a calibration routine, one example of which is described in greater detail below. They may also be determined experimentally based on a particular hardware configuration (e.g., type of camera). Moreover, while the above discussion processes the horizontal and vertical dimensions in sequence, the opposite order may also be employed. Alternatively, multiple dimensions may be processed concurrently rather than sequentially.

Also note that the 'Flag Memories' for HLPF and VLPF in FIG. 6 have been explicitly drawn in blocks 602 and 610, but in particular, the HLPF_Flag Memory may involve saving the HLPF_Flag for the previous (n−1) video lines.

The next step is to use the per pixel location 2D_POI_Flags for edge detection in order to find the boundaries of a given AAOI. It is important to note that multiple AAOI (or, possibly, none at all) may be found within any given video frame of a sequence of frames, and this will be a function not only of the scene being depicted, but also on parameters such as motion level thresholds, skin-tone thresholds and running sum filter thresholds.

So initially, the most important edges to locate may be those of the boundary coordinates that encompass all of the Active Areas Of Interest detected within a video frame. Afterwards, finding the edges for potentially multiple sub-AAOI may be desirable as well.

Figure 8:
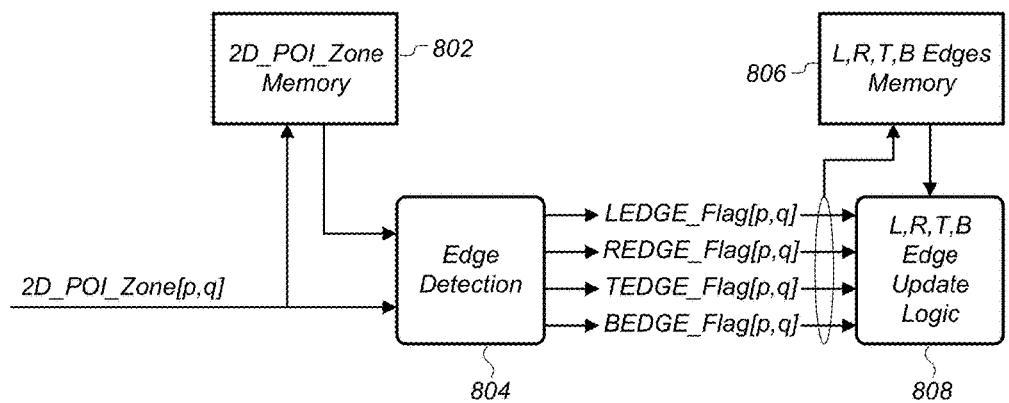
FIG. 8 is a block diagram illustrating an embodiment of an edge detection circuit.

FIG. 8 depicts an embodiment of edge detection circuit 414 that is configured to perform a simple system of edge detection. In this embodiment, the circuit includes 2D_POI_Zone memory 802, an edge detection subcircuit 804, and edge update logic 808, which as described below may be configured to store edge coordinates in memory 806. For this embodiment, all that is needed as input for detecting and updating edges at each pixel location is the following set of 2D_POI_Zone flags:

{2D_POI_Zone[p,q], 2D_POI_Zone[p,q−1], 2D_POI_Zone [p−1,q]}, along with the coordinates, [p, q], of the current pixel location being processed. Remember that according to FIG. 7, index p represents the row coordinate and index q represents the column coordinate. Therefore, the desired set of coordinates for defining a rectangle for the boundaries of an AAOI may be defined as listed in Table 2:

TABLE 2

| | |
|---|---|
| LEDGE [q] | The column coordinate q, for the Left Edge of an AAOI. |
| REDGE [q] | The column coordinate q, for the Right Edge of an AAOI. |
| TEDGE [p] | The row coordinate p, for the Top Edge of an AAOI. |
| BEDGE [p] | The row coordinate p, for the Bottom Edge of an AAOI. |
| Min_LEDGE | The column coordinate q, for the minimum LEDGE of all AAOI found within a video frame. |
| Max_REDGE | The column coordinate q, for the Right Edge of an AAOI. |
| Min_TEDGE | The row coordinate p, for the Top Edge of an AAOI. |
| Max_BEDGE | The row coordinate p, for the Bottom Edge of an AAOI. |

Min_LEDGE, Max_REDGE, Min_TEDGE and Max_BEDGE, together may define the minimum rectangular boundaries of the total AAOI encompassing all (possibly multiple) AAOI within a video frame.

Figure 9:
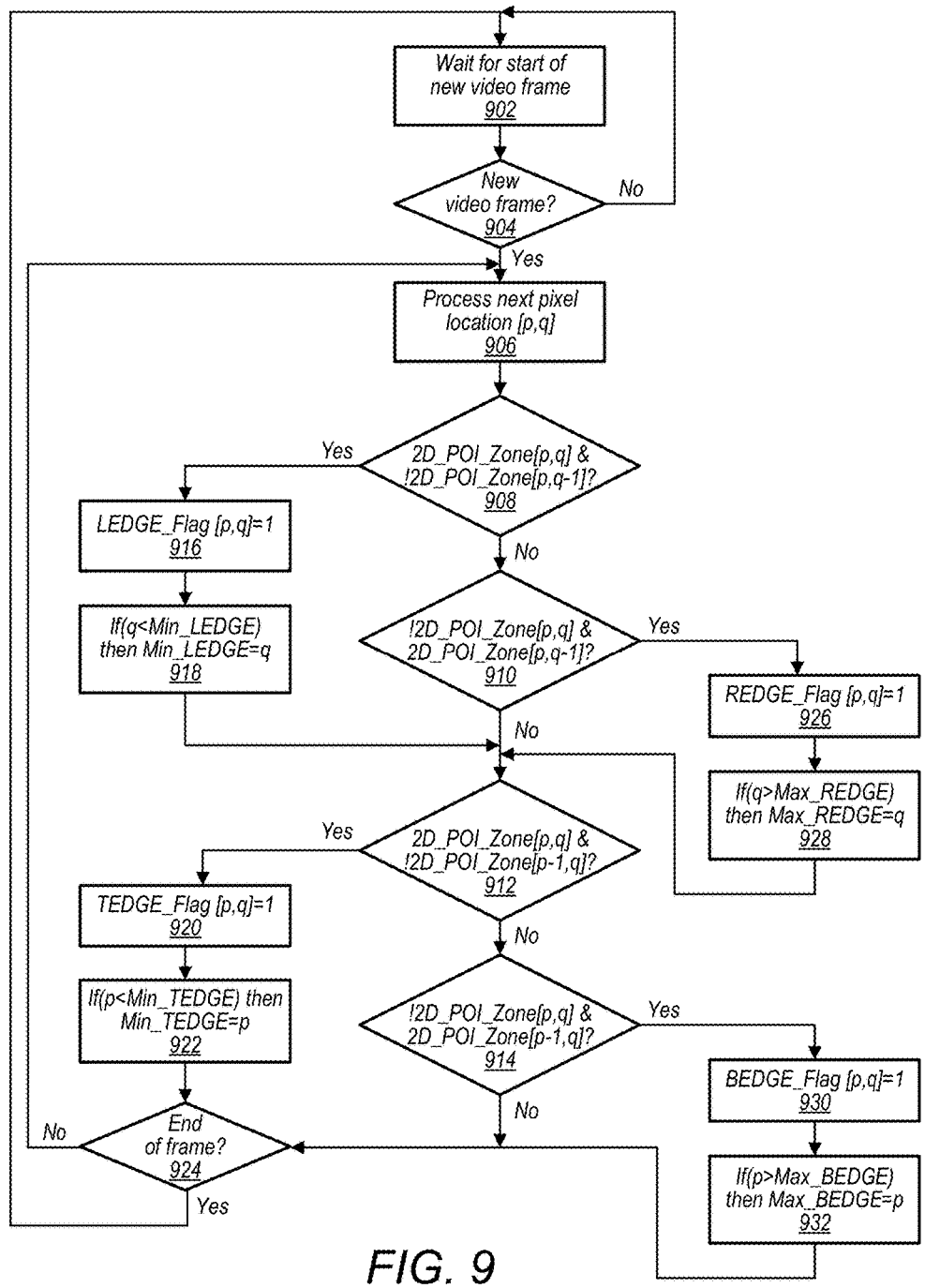
FIG. 9 is a flow chart illustrating an embodiment of a method of identifying coordinates of an AAOI.

With all these definitions in place, one embodiment of a simple algorithm to find the coordinates for this rectangle of the total AAOI within a video frame is shown in the flowchart of FIG. 9. This flowchart describes, algorithmically, how a potential implementation of the Edge Detection and Edge Update Blocks of FIG. 8 may operate in order to find the minimum rectangle encompassing the Total AAOI.

Generally speaking, operation of FIG. 9 begins in block 902 where a start of a new video frame is awaited. If a new video frame is detected (block 904), operation proceeds to processing of the next available pixel location [p, q] (block 906). Initially, this could be the pixel located at origin [0, 0], although as noted above, in some embodiments, pixels within an exclusion region (e.g., closer than m pixels from the left video frame boundary or n pixels from the top video frame boundary) may be omitted.

A series of logical tests may then be performed. In functional terms, if the value of 2D_POI_Zone at [p, q] is true and the value one pixel to the left at [p, q−1] is false, then a left edge of an AAOI may be detected (blocks 908, 916). If q is less than (e.g., farther left than) a current left edge coordinate Min_LEDGE, then the current left edge coordinate may be assigned the value q.

Similarly, if the value of 2D_POI_Zone at [p, q] is false and the value one pixel to the left at [p, q−1] is true, then a right edge of an AAOI may be detected (block 910, 926). If q is greater than (e.g., farther right than) a current right edge coordinate Max_REDGE, then the current right edge coordinate may be assigned the value q.

The vertical dimension is also tested. If the value of 2D_POI_Zone at [p, q] is true and the value one pixel above at [p−1, q] is false, then a top edge of an AAOI may be detected (block 912, 920). If p is less than (e.g., farther above) a current top edge coordinate Min_TEDGE, then the current top edge coordinate may be assigned the value p.

Similarly, if the value of 2D_POI_Zone at [p, q] is false and the value one pixel above at [p−1, q] is true, then a bottom edge of an AAOI may be detected (block 914, 930). If p is greater than (e.g., farther below) a current bottom edge coordinate Max_BEDGE, then the current bottom edge coordinate may be assigned the value p.

If the end of the frame has been reached at block 924, then operation may return to block 902 to await a new frame. Otherwise operation may return to block 904 for selection of a new pixel location.

It is noted that the edge detection operation shown in FIG. 9 is merely one embodiment, and that other implementations using different ordering and/or types of operations are possible and contemplated.

This process could be extended for capturing coordinates of multiple sub-AAOI as well, by keeping track of multiple edges and then sorting and comparing them.

In addition, to determining the bounding rectangle as described above, since the 2D_POI_Zone flag is determined for every pixel location, all the coordinates of each AAOI could be stored in memory for later processing, such as for determining shapes of each AAOI.

It is noted that a number of variations to the procedure described above are possible and contemplated. For example, in some embodiments, to identify one or more pixels of interest within a given frame, multiple iterations may be performed over the given frame, where different iterations apply different combinations or configurations of the filters. For example, one set of filter criteria could be used during one pass, and a different set of criteria (or a different filter) during another pass. Similarly, during multiple passes, different sizes of the multidimensional filter may be applied (e.g., progressing from a wide filter, such as 64×64 pixels to a narrower one, such as 8×8 pixels, or vice versa).

Further, in some embodiments, data derived from one or more frames prior in time to the given frame may be used to identify pixels of interest and/or AAOI. For example, it may be reasonable to assume that a pixel identified as being a POI or within an AAOI within one frame will continue to be so identified within an immediately succeeding frame, and the filters could be configured to take this into account (e.g., weighted by a suitable coefficient).

Dynamic Calibration for Smart Framing

As noted above, the process of AAOI detection begins at the pixel level based on frames received from an image sensor. Pixels are processed to determine whether they satisfy certain pixel-level filters, such as a motion filter (which may be determined by detecting a change in color of a pixel relative to one or more previous frames), a color filter (e.g., a skin tone filter representing a palette of colors likely to represent human skin tones), and/or other filters such as multidimensional low pass filters. The results of AAOI processing may require further processing (e.g., by software) to make them useful for their intended application, such as adjusting the framing of the participants in a videoconference. Further processing may take the raw data provided by AAOI detection and further filter it to improve its suitability for a particular application, such as framing. For example, in a videoconferencing context, such filtering may operate to account for artifacts such as shadows or reflections; to apply a priori knowledge about the video context, such as the location of walls, windows, doors, furniture, or other features; to identify and distinguish different types of motion, such as the motion of participants vs. the motion of artifacts; or any other suitable types of filters or heuristic algorithms.

As described above, the pixel-level processing involves the use of a multidimensional filter in conjunction with a programmable density threshold. For example, the 2-dimensional running sum LPF implementation discussed above uses both a horizontal and a vertical threshold value for determining whether a given POI is within an AAOI. In some embodiments, these threshold values may be determined by framing software based on an analysis of AAOI data provided by the pixel-level processing, and then passed back down to the pixel-level processing for use. For example, framing software may execute on a general-purpose processor to receive pixel-level AAOI data generated by an FPGA or other special-purpose processor, and may pass calculated threshold values back to the special-purpose processor. Thus, determination of the threshold values employed by the AAOI pipeline may be a dynamic, iterative process implemented by a feedback loop, although in some embodiments, these threshold values may be statically, manually, or empirically determined without the use of the dynamic techniques discussed below.

Dynamic calibration refers to the process by which software finds the acceptable threshold value for use by the AAOI pipeline; it formulates a new value continuously due to changing environmental conditions that it learns over time.

Figure 10:
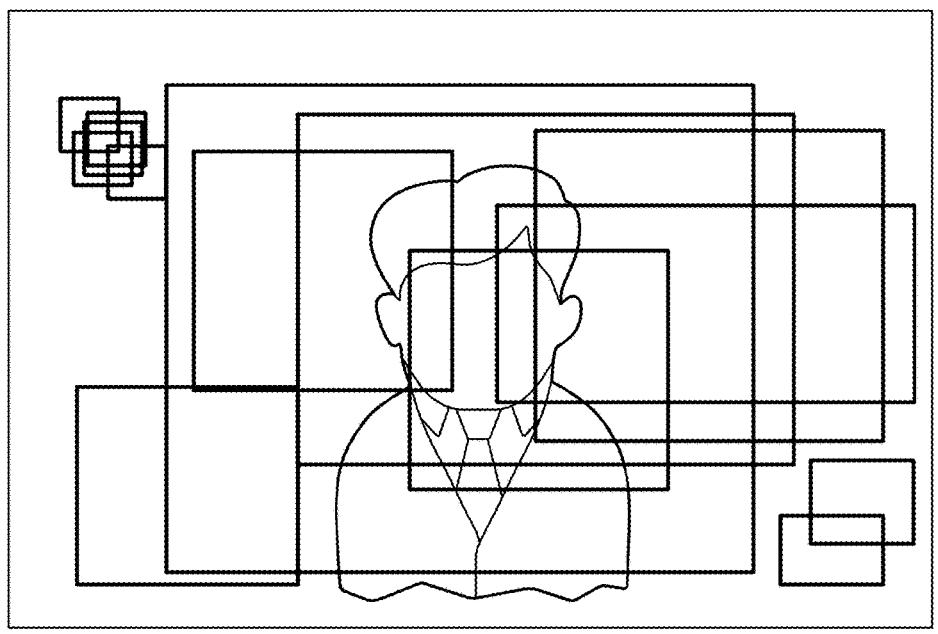
FIG. 10 illustrates an example of AAOI detection in an erratic system.
Figure 11:
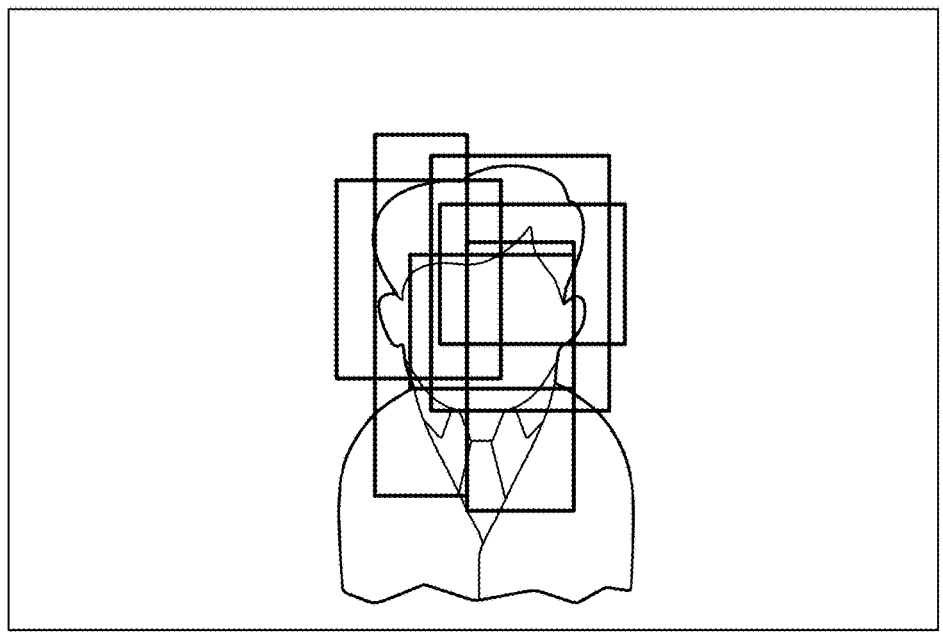
FIG. 11 illustrates an example of AAOI detection in a system employing dynamic calibration.

One basis for the dynamic calibration is stability of detection. The software will learn the optimum threshold values for AAOI detection when the detection of the target(s) is within a range small enough that can be accepted as stable. In FIG. 10, the detection is presented pictorially for an erratic system that does not have dynamic calibration. The black boxes represent detected AAOI regions (e.g., regions that have satisfied pixel-level filters for motion and color, as well as multidimensional filtering) obtained over a sequence of frames, but are impractical for properly locating the target (which in the figure is a person). By contrast, the use of dynamic calibration may improve the extent to which AAOIs produced by pixel-level processing correlate to a feature of interest, as shown in FIG. 11. Although the resulting sequence of AAOIs shown in FIG. 11 may require further processing in order to make decisions on how to adjust framing of the videoconference, it can be seen that the number of irrelevant regions identified as AAOIs is reduced relative to FIG. 8.

Figure 12:
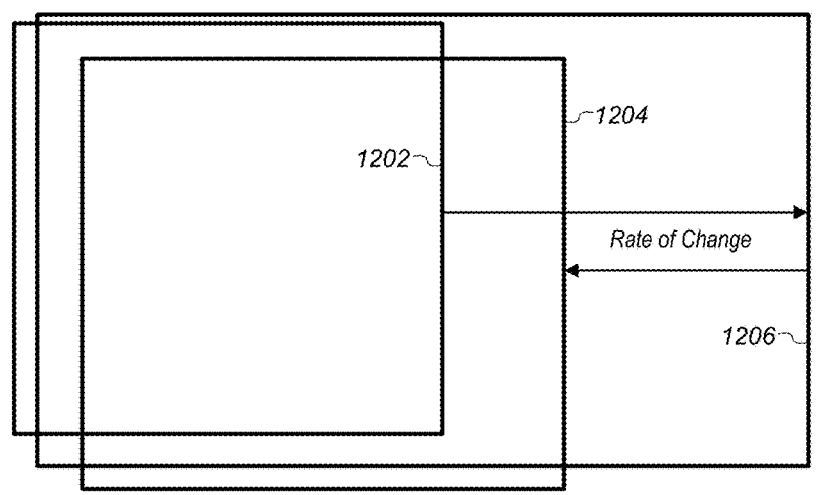
FIG. 12 illustrates an example of how instability of a detection system may be determined.

FIG. 12 illustrates one manner in which the stability (or, inversely, volatility) of the detection system may be determined. Specifically, FIG. 12 illustrates three successive AAOIs 1202-1206 (e.g., corresponding to successive video frames) that have been detected through pixel-level analysis as discussed above. As shown, the right edge of AAOI 1204 is located some number of pixels to the right of the corresponding edge of AAOI 1202. Similarly, the right edge of AAOI 1206 is located a number of pixels to the left of the corresponding edge of AAOI 1204. Intuitively, large changes in the location of AAOI boundaries over time suggest that the AAOI detection is not particularly stable (or, equivalently, is relatively volatile). Correspondingly, one manner of quantifying AAOI stability is to determine the average rate of change of a given AAOI boundary over time, for example by summing the absolute value of the distance in pixels between successive boundaries and dividing by the number of comparisons made. This rate of change value may be independently determined for each of the four boundaries of a rectangular AAOI, although only a subset of boundaries may be employed. An aggregate measure of stability may also be obtained by combining the several measures determined for individual boundaries (e.g., through summing, averaging, or another suitable combination).

Figure 13:
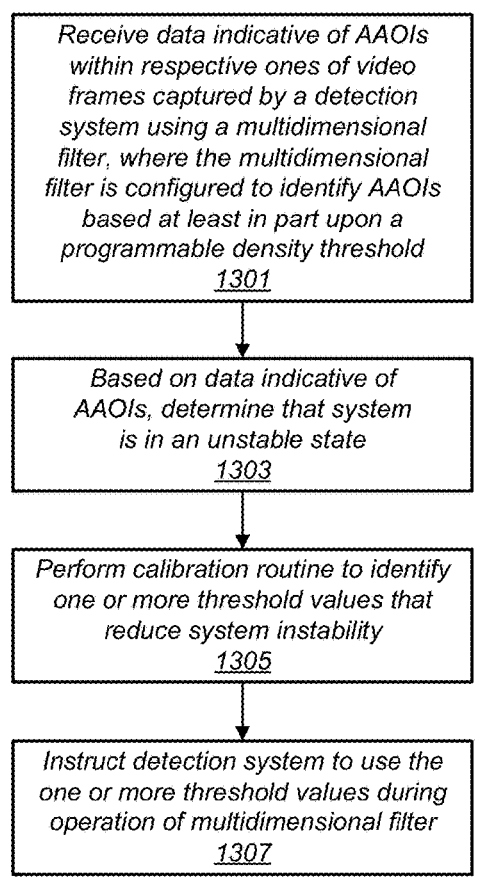
FIG. 13 is a flow diagram illustrating an embodiment of a method of performing calibration based on AAOI stability.

FIG. 13 illustrates an embodiment of a method of performing calibration based on the concept of AAOI stability shown in FIG. 12. Operation begins in block 1301 in which data indicative of AAOIs detected within respective ones of a plurality of video frames is received. The video frames may be captured by a detection system using a multidimensional filter that is configured to identify AAOIs based at least in part upon a programmable density threshold, such as 2-D LPF filter 412 discussed above.

Based on the data indicative of the AAOIs, it is determined that the system is in an unstable state (block 1303). For example, to determine that the system is in an unstable state, it may be determined that a rate of change associated with the AAOIs exceeds a defined level. The rate of change associated with AAOIs may, for example, be based upon a rate of change of one or more AAOI boundaries, as shown in FIG. 12.

A calibration routine is then performed to identify one or more threshold values that reduce system instability (block 1305). Aspects of calibration are discussed in greater detail below with respect to FIG. 14. As examples, performing the calibration routine may include identifying one or more threshold values that satisfy a set of content-based futures, and/or identifying one or more threshold values that result in an update to a topology (discussed below) associated with the video frames.

As discussed below, in some embodiments, the calibration routine may be performed based at least in part on determining that a change in framing of a video presentation has occurred. For example, during a videoconference or other video presentation, if the framing of the main view camera is changed owing to changes in pan, tilt, zoom, or other camera characteristics, the calibration routine may be performed. Such calibration may, in some cases, occur independently of whether the system has otherwise been detected to be in an unstable state. Additionally, as discussed below, in some embodiments the calibration routine to be performed may be selected from a number of calibration routines based at least in part upon determining whether the detection system is in an initialization state or an operational state.

Subsequently, the detection system is instructed to use the one or more threshold values during operation of the multidimensional filter (block 1307). For example, the calibration routine may interface with integrated circuit 400 in order to convey the programmable horizontal and vertical threshold values shown in FIGS. 6 to 2-D LPF circuit 412.

In some embodiments, the dynamic calibration process attempts to maximize stability/minimize volatility by identifying threshold value(s) for the multidimensional filter(s) that produce the smallest rate of change. In some cases, additional requirements may be imposed before a threshold value is identified as being a stable candidate. For example, a maximum rate of change may be experimentally defined for a given system (e.g., based on the properties of the lens, sensor, or other components employed by the system). If a threshold value produces a rate of change that does not satisfy the maximum rate of change limitation, the threshold value may be disqualified as a stable candidate value, even if it otherwise tends to minimize the rate of change.

Before proceeding, it is noted that "stability" may be defined and measured differently for different applications. For example, in a videoconferencing context, where participants tend to move within a constrained range relative to the region of the frame that they occupy, the rate of change of a stable AAOI may be relatively small as a fraction of the size of the frame. However, in other applications, the target of interest may be moving, possibly continuously. For example, if trying to detect a moving car, the car will likely be in different positions in successive video frames. In this context, "stability" might be defined in terms of how continuous or uniform the AAOI boundary movement is over time, rather than in terms of absolute movement. For example, AAOI stability with respect to a moving object may be quantified in terms of the extent to which AAOI boundaries correspond to a particular type of motion (e.g., linear motion) over time, as opposed to random or discontinuous motion.

Broadly speaking, to perform dynamic calibration, initially all possible threshold values may be evaluated, with the most stable members of this set selected. However, because of the environmental changes during system operation (e.g., due to lighting, reflections, participants entering and exiting), the selected threshold value(s) may be changed over time as data is collected during system operation. When a stable value is attained, in some embodiments, the video data immediately before, during, and after the point at which the stable value is identified may be used for downstream processing (e.g., to control framing adjustments). Bracketing the data in this fashion may increase the likelihood of obtaining usable data, particularly when the data received from pixel-level processing is noisy or frequently unstable.

Figure 14:
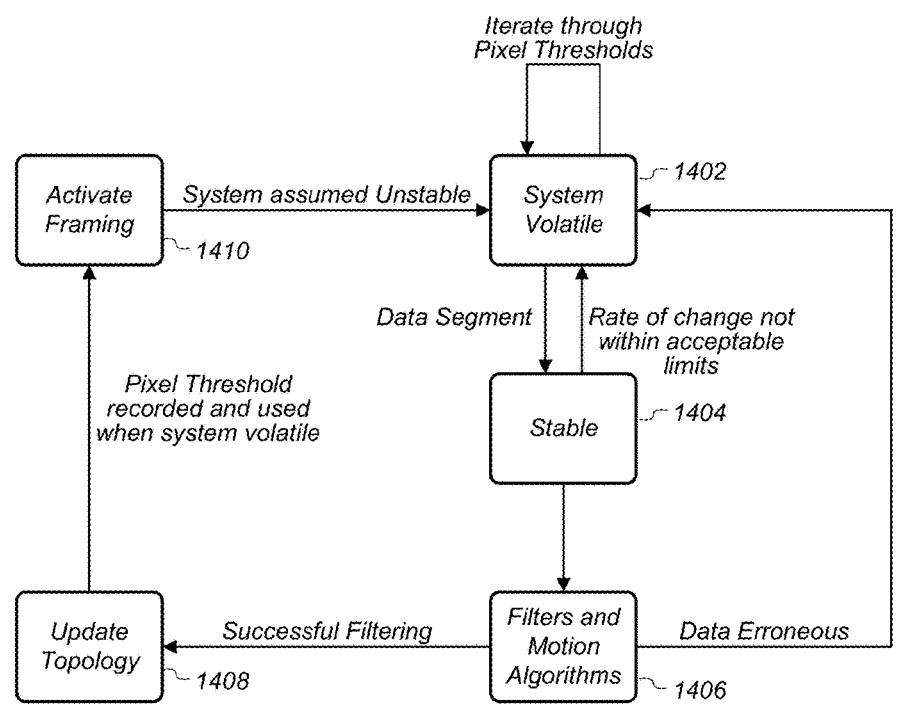
FIG. 14 illustrates an example of a calibration state machine.

One example of a calibration state machine is shown in FIG. 14, which will first be described in general terms and then examined in more detail. The illustrated state machine shows aspects of dynamic calibration within a larger control context that also includes generation of a framing topology (discussed in a subsequent section). Broadly speaking, during system operation, the system may spend a considerable part (possibly a majority) of the time in the "volatile" or unstable state (block 1402). In a videoconferencing context, this is often because the detected data (filtered, e.g., for motion and skin detection) may include numerous artifacts due to features such as walls, windows, reflections, tables, and so forth.

The state machine attempts to find a point in time, within the environment that framing is used, when the data received is stable (block 1404). In some embodiments, it does this by examining different thresholds to be used in the multidimensional filter of the AAOI pipeline described above. Broadly speaking, the data received afterwards is checked for stability and later sent through a set of filters and motion algorithms (block 1406) to ensure its usability. Much of the data received may be discarded as it will be the result of environmental artifacts rather than the desired target(s). The filters and motion algorithms may use historical data collected during system operation to recognize detection of targets rather than artifacts. For example, these filters may rely on a priori knowledge of the environment, such as the locations of furniture or other objects. They may also employ models of how common targets within the frame tend to behave (e.g., the types of motion patterns exhibited by videoconference participants or other types of targets).

Only a small amount of data may satisfy the filters and motion algorithms. At the "update topology" state (block 1408), this data may be added to the 3D topology of the environment, which is discussed in greater detail below. Broadly speaking, the 3D topology may represent a model of the environment over time (e.g., of the room in which the videoconference is being conducted). The 3D topology may reflect cumulative system behavior over a longer time scale than other types of processing discussed here (e.g., on the order of minutes, as opposed to the frame-by-frame pixel-level processing of the AAOI pipeline, which may operate on the order of milliseconds). In some embodiments, when frame data is accepted by the filters and used to update the topology, the state of the threshold value(s) used for multidimensional filtering is saved for later use, for example when the system again enters a volatile or unstable state. As discussed below, in some embodiments, threshold values that are in use when the 3D topology is updated may be identified as such, to distinguish them from threshold values that were derived at other points in the state machine with different levels of confidence.

At certain points during system operation, the 3D topology may indicate that an adjustment to framing is needed (block 1410). For example, the system may determine that the participants in a videoconference have moved such that the display of the participants is no longer optimally framed (e.g., the main camera should zoom in or out to account for the changed arrangement). When framing adjustments are activated, it may be assumed that the system is no longer in a stable state, since the relative positions of targets and artifacts within the frame has changed. Accordingly, recalibration may be performed starting from the "volatile" state.

Figure 15:
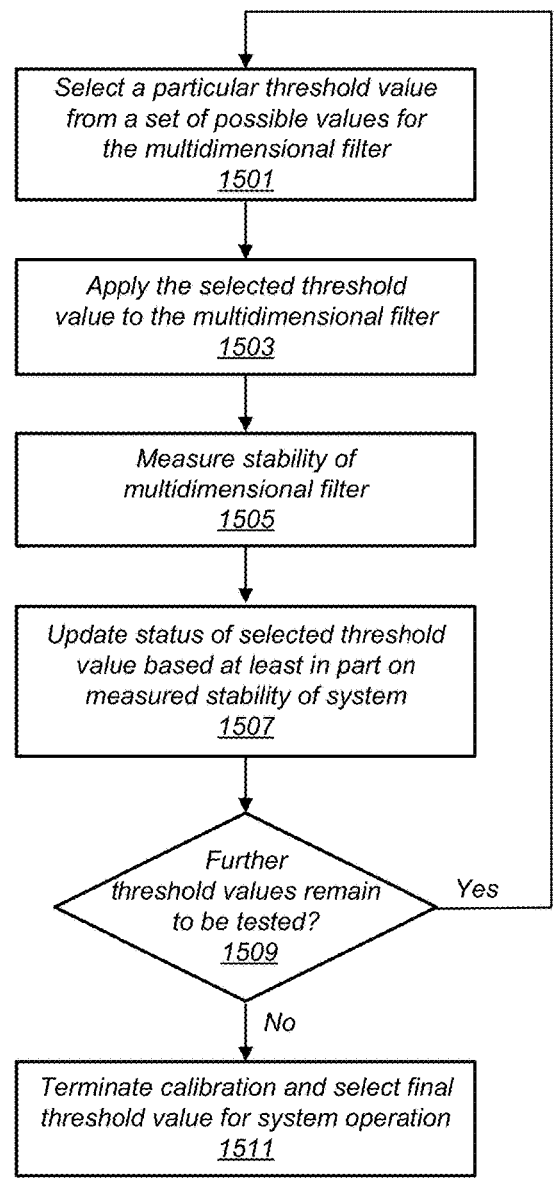
FIG. 15 is a flow diagram illustrating an embodiment of a method of calibration.

The state machine of FIG. 14 includes several different calibration loops that may operate on different timescales and yield results of varying levels of confidence or reliability. One example of a calibration loop is formed by the volatile and stable states. In one embodiment, as shown in FIG. 15, operation of this calibration loop may begin by selecting a particular threshold value from a set of possible values for the multidimensional filter (block 1501).

For example, in the discussion of the running sum LPF presented above, this filter was characterized as an m- by n-filter, where m and n define the filter size (i.e., the number of pixels over which the running sum is calculated in each of the two dimensions of the video frame). The size of the filter may determine the total number of possible output values of the filter, and by extension, the number of possible threshold values. However, not all possible threshold values may be useful during actual operation. For example, empirical testing may show that only a subset of all possible threshold values should be considered during calibration. Thus, in the case of a 64×64 running sum LPF, only the values in the lower half of the range (e.g., from 1 or 2 to 30 or 31) may be considered as possible threshold values during calibration.

In the case of a multidimensional filter, each dimension may have an associated threshold value that can be independently determined. Accordingly, in some embodiments, selecting a particular threshold value to test may include selecting a particular combination of the threshold values for the multiple dimensions. For example, suppose the range of threshold values to be checked for each of two dimensions is 2 to 31. The total number of combinations to be checked may then be 30×30=900 combinations. However, as described below, not all possible combinations may be tested in some embodiments, depending on the amount of other information is available that indicates the relative confidence or reliability of certain values.

The selected threshold value may then be applied to the multidimensional filter (block 1503). For example, selected horizontal and vertical thresholds may be communicated to the AAOI pipeline for use during application of the multidimensional filter.

The stability of the multidimensional filter system may then be measured (block 1505). For example, in the case of a videoconferencing system, the rate of change of one or more AAOI boundaries may be determined as discussed above, and the system may be deemed to be stable if the rate of change is below an acceptable defined level.

The status of the selected threshold value may then be updated based at least in part on the measured stability of the system (block 1507). For example, the selected threshold value may be flagged as producing either stable or unstable behavior, placed on a list of stable or unstable candidates, or otherwise persistently identified. In some instances, instead of or in addition to simply flagging a selected threshold value as stable or unstable, a metric may be stored that indicates a relative degree of the selected threshold value's performance, e.g., so that candidate values may later be compared or ranked against one another.

If further threshold values remain to be tested within the set of possible values, another value may be selected and the above operations may be repeated (blocks 1509-1501). The next value to be tested may be selected in a numerically progressive manner, or an optimization or goal-seeking algorithm (e.g., gradient descent) may be used to select the next candidate.

Otherwise, calibration may terminate and a final threshold value may then be selected for system operation (block 1511). In various embodiments, the final threshold value may simply be the most recently tested threshold value that was identified as stable, or may be selected from a ranking or comparison of all stable candidates (e.g., based on an associated metric, as described above).

The result of the calibration procedure just described may yield a set of threshold values that yield measured system stability according to the criterion employed during calibration (e.g., rate of change of AAOI boundaries, or another suitable criterion), along with another set of threshold values that—at least on the current occasion—do not yield stability. On a subsequent occasion, calibration may need to be performed again. For example, system stability may be measured at various intervals of time to determine whether stability has been lost. Additionally or alternatively, calibration may be repeated at various intervals of time regardless of the state of the system, for example, in order to update the relative performance metrics associated with the threshold values. In some embodiments, when calibration is repeated, only the threshold values that were previously identified to yield measured system stability may be tested, and the values identified to be unstable may be omitted. Alternatively, the threshold values previously identified to be stable may be prioritized for testing over the remaining values. In some embodiments, when calibration is repeated, it may terminate as soon as a stable threshold value is identified, rather than proceeding to test all eligible candidates; this may reduce resource requirements for performing calibration.

A second calibration loop may be presented through the application of the filters and/or motion algorithms that may be applied to further refine detection of targets rather than artifacts within a frame. As discussed above, the video system may deemed to be stable based on, e.g., a rate of change of one or more AAOI boundaries. However, the threshold values that produce a satisfactory rate of change may nevertheless result in identification of artifacts rather than targets.

Accordingly, in some embodiments, the set of threshold values identified as yielding system stability based on the first criterion used during calibration (e.g., rate of change) may be further refined on the basis of filters and/or motion algorithms that are specifically configured to evaluate aspects of the content of a video frame. As noted previously, such filters may be implemented to model the arrangement of a room or scene within the video frame, e.g., by modeling the location of walls, ceilings, doors, windows, furniture, and/or other features. In some applications, different filters may be applied to different regions of a frame (e.g., doors may be filtered differently from windows, based on a prior knowledge that participants interact differently with doors than windows). Motion algorithms may be employed to attempt to distinguish the motion of targets (e.g., videoconference participants or particular objects being sought within a frame) from the motion of artifacts (e.g., shadows, lighting changes).

Figure 16:
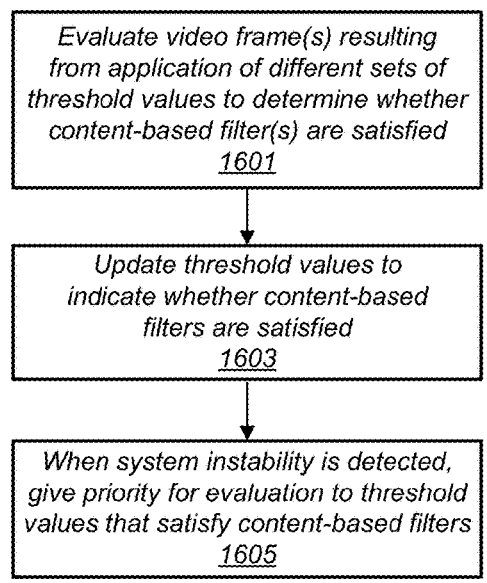
FIG. 16 is a flow diagram illustrating another embodiment of a method of calibration.

An embodiment of application of this second calibration loop is shown in FIG. 16. Operation begins in block 1601 where video frames resulting from the application of different sets of threshold values may be evaluated to determine whether they satisfy a set of content-based filters, such as those just described. As a result, a further discrimination may be made: the set of threshold values identified as satisfying the first criterion for system stability may be further divided into threshold values that satisfy the set of content-based filters, and those that do not. The various threshold values may be further updated to indicate the status of this discrimination (block 1603). For example, as described above with respect to the first calibration loop, a threshold value may be flagged as satisfying or not satisfying the content-based filters, placed on an appropriate list, or otherwise persistently identified. As noted previously, a metric may also be stored that indicates a relative degree to which a given threshold value satisfies the set of content-based filters, so that thresholds may be ranked or compared against one another on the basis of this second calibration criterion.

In some embodiments, those threshold values that satisfy the set of content-based filters may be given priority for evaluation when the system is detected as being unstable (block 1605). For example, instead of iterating through a number of possible combinations of threshold values, as may be performed during initial calibration, only the smaller set of thresholds having been identified as satisfying the set of content-based filters may be initially tested. If this set of thresholds does not produce stability, then the scope of the search may be broadened (e.g., by considering thresholds that previously satisfied the stability criterion, but not the content-based filters).

As shown in FIG. 14, video frames that satisfy the set of content-based filters may be used to update the 3D topology, as discussed below. In some embodiments, such frames may need to satisfy a set of criteria beyond those specified by the content-based filters. Accordingly, this procedure may represent a third calibration criterion that may be employed to distinguish various threshold values. That is, whether or not a threshold value resulted in an update to the 3D topology may be persistently recorded and later used to further distinguish that threshold value from other values that satisfied only the initial stability criterion or the content-based filters criterion. For example, a threshold value that resulted in a topology update may be given the highest priority as a candidate value when system instability is detected. In some embodiments, however, it is noted that video frames that satisfy the content-based filters may be unconditionally used to update the 3D topology, and in such cases, the topology update need not represent a distinct calibration criterion.

The various calibration procedures discussed above may present significant computational workloads relative to more routine image processing tasks. For example, content-based filtering may involve application of complex algorithms. Depending on the computing resources available within the system, it may be desirable to limit the amount of resources dedicated to performing calibration during normal system operation, for example to avoid introducing processing lag or otherwise impairing the performance of the system's primary image processing task (e.g., displaying a videoconference).

Accordingly, in some embodiments, different calibration techniques may be employed during different phases of system operation. For example, an initialization phase of operation may be performed when a system is first installed, powered on, or otherwise is not engaged in its primary image processing task. During initialization, all available calibration techniques may be employed. For example, all relevant combinations of threshold values may be iteratively evaluated for stability (e.g., on the basis of measured rate of change of AAOI boundaries) within the first feedback loop discussed above, and content-based filtering may be applied to those thresholds that satisfy the stability criterion. (In some embodiments, content-based criteria may be applied even to thresholds that do not satisfy the stability criterion, e.g., for the purpose of collecting statistics on baseline system operation.) If applicable, thresholds that result in an update to the 3D topology may also be identified during initialization.

In contrast to the initialization phase, an operational phase occurs when the system is engaged in its primary image processing task (e.g., is deployed for its intended purpose, such as conducting a videoconference, detecting targets of interest, etc.). During the operational phase, the computational resources allocated to calibration may be limited in a number of different ways. For example, calibration may be limited to the first feedback loop that employs the first criterion for system stability, which may reduce computational resource requirements relative to those used for content-based filtering. The range of candidate threshold values evaluated during calibration may be restricted or prioritized, for example on the basis of information gathered during previous calibrations. Calibration may terminate when the first acceptable threshold is found, even if that threshold is not necessarily optimal relative to other thresholds. Explicit limits may be placed on the fraction of computational resources (e.g., processor cycles and/or memory) that may be utilized by calibration. Limits may also be placed on how frequently calibration is performed during the operational phase. In various embodiments, any suitable combination of these techniques or others may be employed to manage calibration resource utilization.

Topology Criteria for Smart Framing

As discussed in detail in the previous section, one role of the dynamic calibration system is to attempt to filter detected AAOIs according to application-specific filters, motion algorithms, or other algorithms aimed at suppressing false negatives and false positives. That is, AAOIs that satisfy the filtering of dynamic calibration should be reasonably likely to be relevant to the particular application. For example, in a videoconferencing context, such AAOIs would be reasonably likely to contain one or more videoconference participants, who represent potential targets to be used in making decisions regarding videoconference framing, as discussed below. In other types of applications, such AAOIs would be reasonably likely to identify content defined to be relevant for that application (e.g., moving cars or other types of objects). The likelihood of an AAOI being correctly identified as relevant by the dynamic calibration process may depend, for example, on the sophistication of the algorithms employed for filtering and detection, the amount of computing power available to perform the analysis, and/or other factors. Generally speaking, however, the likelihood of an AAOI being correctly identified as relevant should be greater than random chance.

Accordingly, AAOIs that satisfy the filtering and detection aspects of dynamic calibration may be considered "high confidence" data useful for further processing (although such data may still contain errors, such as false positives and/or false negatives.) Moreover, AAOIs can be identified as having a location within a two-dimensional video space. For example, in a videoconferencing context, the two-dimensional video space may be defined in terms of the maximum available field of view (e.g., the entirety of a room or setting capable of being imaged, accounting for the pan, tilt, and/or zoom capabilities of the imaging camera) or, alternatively, in terms of the boundaries of the current video frame (e.g., the two-dimensional set of pixels being captured by an imaging camera at a given point in time with a given framing configuration of pan, tilt, and/or zoom settings). In dual-camera videoconferencing applications that employ a fixed-zoom framing camera and an adjustable primary imaging camera, the two-dimensional video space may be defined in terms of the field of view of the framing camera.

In other types of applications, the video space may be defined in terms of parameters suitable for those applications.

The two-dimensional video space may provide a context for tracking and representing AAOI data over time. Specifically, in some embodiments, AAOI data output from the dynamic calibration process may be continuously added to a topological map that, broadly speaking, represents a histogram of AAOI data over the two-dimensional video space. That is, as discussed in greater detail below, the resulting topological map may indicate the locations within the video space where AAOIs received from the dynamic calibration process have been detected, as well as the relative frequency of detection at those locations. The topological map may therefore represent the location and frequency of AAOI occurrences over a given historical period of time.

Figure 17:
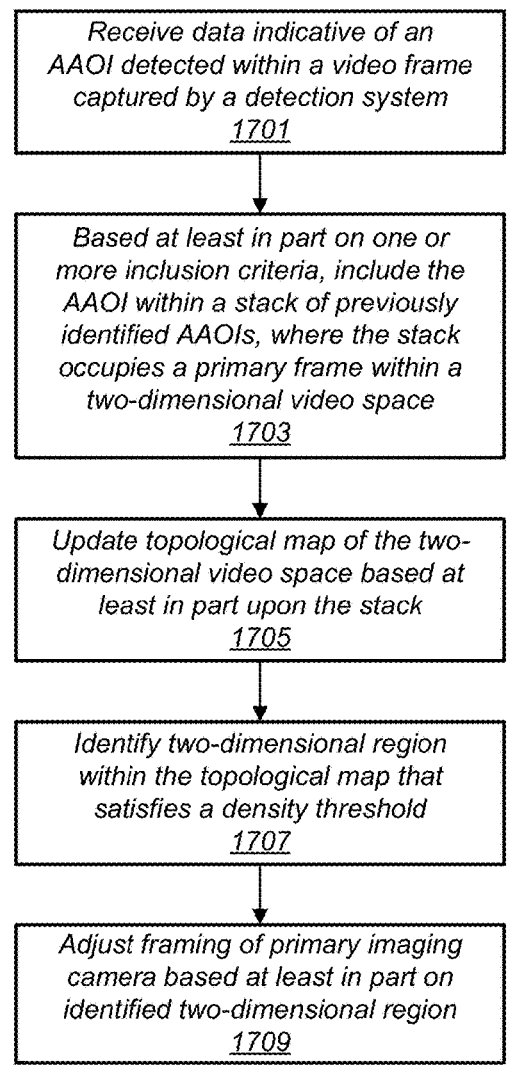
FIG. 17 is a flow diagram illustrating an embodiment of a method of adjusting framing of a primary imaging camera using a topological map of AAOI data.

An embodiment of a general method of adjusting the framing of a primary imaging camera using a topological map of AAOI data is shown in FIG. 17. Operation begins in block 1701 where data is received that is indicative of an AAOI detected within a video frame captured by a detection system (e.g., the system described above with respect to FIG. 4 and its related components).

Based at least in part on one or more inclusion criteria, the AAOI is included within a stack of previously identified AAOIs, where the stack occupies a primary frame within a two-dimensional video space (block 1703). Examples of stack assembly within the primary frame are discussed in greater detail below. In various embodiments, the inclusion criteria may include a degree to which the AAOI overlaps the primary frame within the two-dimensional video space, and/or an age of the AAOI.

A topological map of the two-dimensional video space is updated based at least in part upon the stack (block 1705). For example, as described in greater detail below, the representation of the stack within the topological map may be dependent upon a number of variables, such as an area of the primary frame of the stack, a density of the stack, an age of the stack, and/or other variables.

A two-dimensional region within the topological map that satisfies a density threshold is identified (block 1707). For example, as described in greater detail below, the topological map may be evaluated to identify the smallest two-dimensional region that maximizes the density of peaks of the topological map that are contained by that two-dimensional region. Because the topological map is constructed based on accumulated AAOI data processed via the generation of stacks and updating of the topological map, this region may be probabilistically likely to contain a high degree of features of interest, and correspondingly represent a suitable region for framing the video data. Accordingly, framing of a primary imaging camera is then adjusted based at least in part upon the identified two-dimensional region (block 1709).

As just discussed, a topological map of AAOI data may be formed by constructing "stacks" of AAOIs within the two-dimensional video space. Generally speaking, a stack corresponds to a data structure indicative of various properties of the AAOIs that are members of the stack. While a stack can be visualized as a three-dimensional entity, the data representative of the stack may be stored in any suitable record format.

Figure 18:
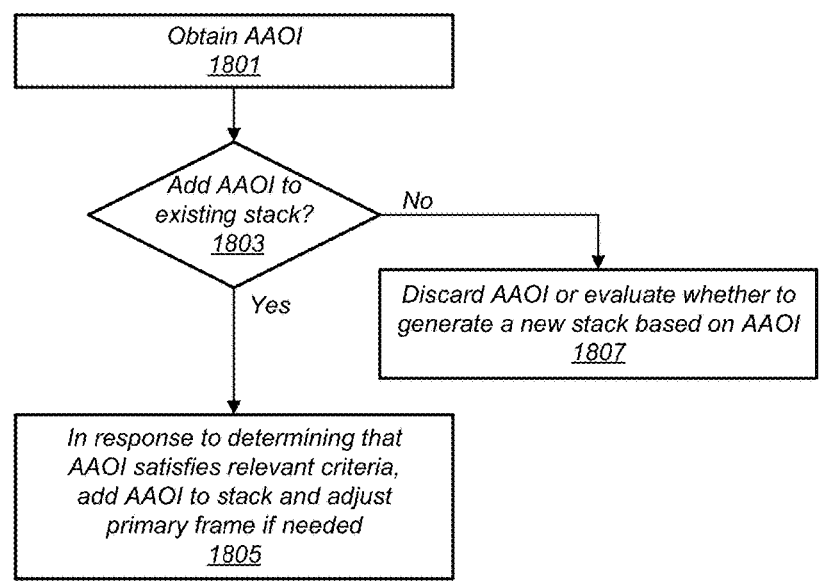
FIG. 18 is a flow diagram illustrating an embodiment of a method of constructing a stack.
Figure 19:
FIG. 19 is a conceptual diagram illustrating an example of AAOI stack formation.
Figure 19:
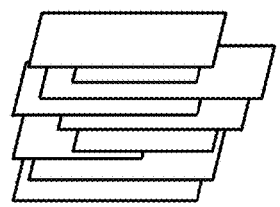
Figure 19:
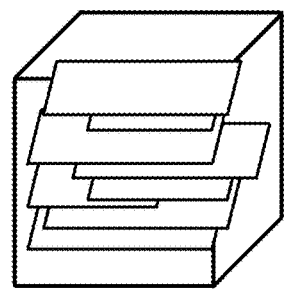
Figure 19:

One embodiment of a method of constructing a stack proceeds as follows, in conjunction with FIGS. 18-19. First, an AAOI is obtained (block 1801). Typically, the AAOI will have been previously processed in order to improve the likelihood that the AAOI encompasses content that is relevant for a particular application. For example, the AAOI may be an AAOI that has satisfied the content and/or motion-based filtering and detection of the dynamic calibration process discussed above. However, the obtained AAOI may be pre-processed according to other techniques than those described with respect to dynamic calibration. For example, machine learning, artificial intelligence, or other suitable algorithms for content detection and/or image filtering may be employed.

If there is an existing stack within the topological map in the vicinity of the AAOI, the AAOI may be evaluated to determine whether it should be added to that stack (block 1803). For example, a given stack in the topological map may be defined in terms of a "primary frame." The primary frame represents the bounding box within the two-dimensional video space that encompasses all of the AAOIs that are current members of the given stack. In some embodiments, evaluating the AAOI may include determining whether the percentage of the area of the AAOI that overlaps the primary frame exceeds a threshold value. The threshold value may differ for different types of video applications, and may be constant or may vary in different regions of the two-dimensional video space. For example, in a videoconferencing context, targets of interest (e.g., participants) may more likely be located near the center of the video space than around its edges, and the selection of threshold values may reflect this tendency.

In some embodiments, further criteria may be evaluated for determining whether to add an AAOI to a given stack. For example, the age of the AAOI may be evaluated to determine whether it satisfies an age threshold of the given stack. As discussed in greater detail below, the age threshold generally affects the dynamic behavior of the stack over time.

In response to determining that the AAOI satisfies the relevant criteria for being added to the given stack (e.g., overlap threshold, age of the AAOI, and/or other applicable criteria), it is added to the stack (block 1805). Additionally, the dimensions of the primary frame are adjusted if necessary to account for the dimensions of the newly added AAOI. For example, if the AAOI only partially overlaps the given stack, then some part of the AAOI will extend beyond the given stack, and the primary frame dimensions may be extended to account for this.

If, however, the AAOI does not satisfy the relevant criteria for being added to the given stack, in some embodiments, it may simply be discarded, although as discussed below, a separate evaluation may be performed to determine whether to generate a new stack based on the AAOI (block 1807).

As noted above, a stack may have an age criterion associated with it. In some embodiments, as a procedure independent from adding AAOIs to the given stack, the AAOIs that are currently members of the given stack may be repeatedly evaluated to determine whether their ages no longer satisfy the criterion for the given stack. (While the age criterion used to remove AAOIs from a stack may be the same as the criterion used to determine whether the add an AAOI to the stack, in some embodiments different criteria may be used.) AAOIs that "age out" of the stack (i.e., become too old to satisfy the age criterion) may then be removed, and the primary frame dimensions adjusted accordingly. Thus, if AAOIs are not added to a given stack sufficiently often, the given stack will tend to shrink over time as AAOIs are removed, and the given stack may ultimately disappear stacks of AAOIs. In some embodiments, the age criterion for removing AAOIs from a stack, as well as the criteria for adding AAOIs to a stack, may vary based on the height of the stack.

Generally speaking, the shorter the age criterion (i.e., biased towards younger AAOIs), the more quickly a given stack will decay, assuming a constant rate of addition of AAOIs to the given stack. In some embodiments, this property may be employed to process stacks in different areas of the two-dimensional video space differently. For example, in a videoconferencing context, a priori knowledge of the context may suggest that the middle region of the video space may have relatively static content (e.g., videoconference participants seated around a table who tend to remain in roughly the same vicinity for relatively lengthy periods of time) whereas the outer boundary of the video space may have relatively dynamic content (e.g., doors or peripheral areas of a room that people tend to move through without remaining). Accordingly, stacks located in the vicinity of the outer boundary may employ a shorter age criterion, and thus decay relatively quickly in a manner consistent with the nature of the content expected to be observed there. On the other hand, stacks located in the middle or central region may employ a longer age criterion and thus remain relatively persistent, again consistent with the nature of the content expected to be observed there. In other types of video processing applications, different mappings of age criteria to the video space may be applied, consistent with what is known about the behavior of the content relevant to the application context.

In the event that there is no stack in the vicinity of an obtained AAOI, the AAOI may be evaluated to determine whether to create a new stack having a primary frame determined by the boundaries of the AAOI. In some embodiments, a new stack may be created unconditionally if there is no existing stack within the vicinity of the AAOI. However, it may be desirable to wait for confirmation before creating a stack. Accordingly, in some embodiments, creation of a new stack may be conditioned on whether criteria for new stack formation are satisfied. For example, a new stack may not be created in a given area of the two-dimensional video space until a threshold number of AAOIs have been detected over a specified period of time. Stack creation may additionally be qualified in terms of the degree of overlap of the previously detected AAOIs, although this is not essential. Additionally, it is noted that in some embodiments, an AAOI may be evaluated for creation of a new stack if it fails to qualify for inclusion in an existing stack in the vicinity of the AAOI. However, the criteria for stack creation in this case may differ from the criteria employed when no stack exists in the vicinity of the AAOI. For example, the criteria for stack creation when no stack exists may be easier to satisfy, and thus more likely to result in stack creation, than the criteria employed when an AAOI has been rejected for inclusion in an existing stack.

Generally speaking, the criteria that are employed for stack creation as well as for discarding AAOIs from existing stacks (which can result in stack destruction over time) may be selected to implement a type of hysteresis or bistable system behavior with respect to stack creation and destruction. For example, as noted above, criteria such as frequency of AAOI occurrence, AAOI age, and location may be evaluated to determine whether to create a new stack. Similarly, degree of AAOI overlap with a stack's primary frame and the age of the AAOI may be considered to determine whether to add an AAOI to an existing stack, and AAOIs may also be removed from a stack when they grow older than a threshold age for the stack. Collectively, these criteria may be selected to favor preservation of existing stacks over formation of new stacks.

In other words, the topology system may be tuned so that creation of new stacks is relatively difficult, whereas preservation of existing stacks is relatively easy. For example, the criteria for adding an AAOI to an existing stack may, on average, be more frequently satisfied than the criteria for creating a new stack from an AAOI. By tuning the topological map in this fashion, the map may be better able to identify features of interest for a given video application, and better able to disregard noise and artifacts. For example, an AAOI that occurs in an area where there is no existing stack may be likely to be transient noise, such as a shadow or reflection in a videoconference context. By waiting for confirmation from subsequent AAOIs before creating a stack, noise and artifacts may be more effectively filtered. By contrast, participants in a videoconference tend to remain in relatively static positions for long periods of time relative to other activity within the video frame. By decreasing the rate at which frames "age out" of existing stacks and increasing the likelihood of an AAOI being added to an existing stack relative to creating a new stack, existing stacks may tend to be persistent over time. This in turn may enable the system to better track targets of interest (e.g., videoconference participants) within the video frame.

Framing Topology

Figure 20:
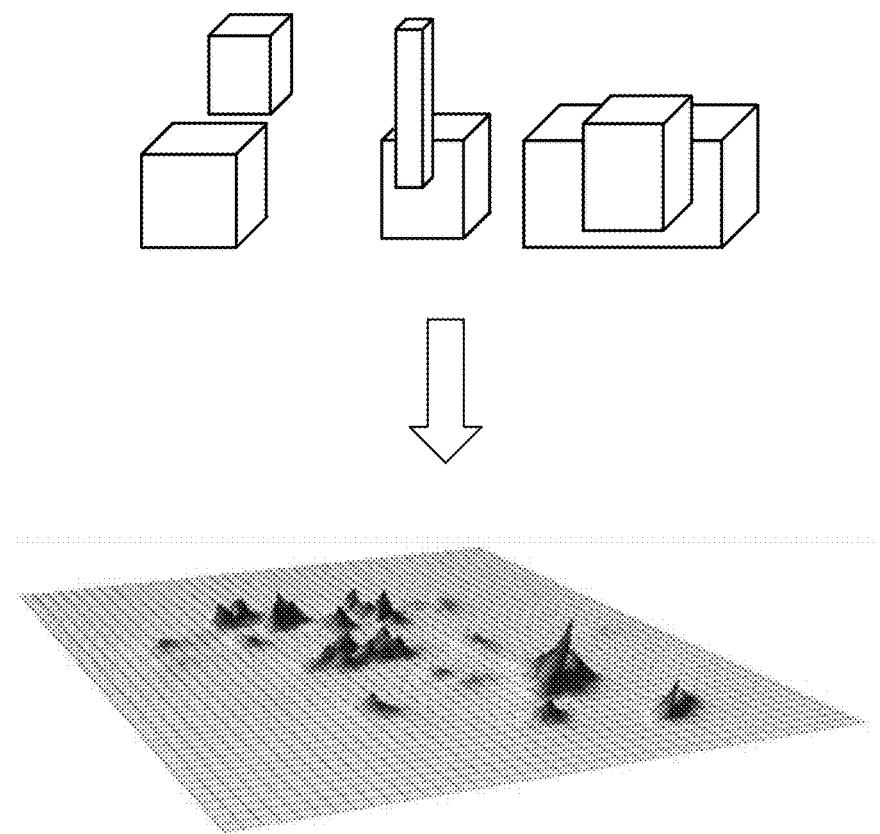
FIG. 20 illustrates an example of a hypothetical topological map constructed based on stack formation.

One example of a hypothetical topological map that may be constructed based on the stacks discussed above is shown in FIG. 20. Although stacks have been described as generally rectilinear, their representation in the topological map need not be. For example, the edges of stacks may be smoothed or interpolated if desired for a particular application. Moreover, while the height of a stack may be determined by the number of AAOIs included in the stack, the height of a peak of the topological map that corresponds to a given stack may be determined according to a combination of variables, including but not limited to: the area of the stack's primary frame, the density of frames within the stack (e.g., determined as a function of the average overlap of the stack's frames with the primary frame), an age of the stack, and/or other suitable criteria.

In some embodiments, it is contemplated that stacks may be merged over time. For example, if two distinct stacks are less than a threshold distance apart within the two-dimensional video space, they may be combined into a single stack. Other parameters may also be taken into account, such as the relative ages of the stacks to be combined, their heights (i.e., the number of AAOIs they contain), and/or other suitable criteria. Merging of stacks would result in merging of corresponding peaks within the topological map, although the result may or may not be strictly additive. That is, the corresponding height of the merged peaks could be less than, equal to, or greater than the sum of the two peaks, depending on the application.

It is noted that although the illustrated topological map represents isolated peaks, different topological features may occur in other applications. For example, in an application directed to the detection of moving objects (e.g., vehicles, individuals in motion, etc.), the target of interest may trace a path through the two-dimensional video space over time as it moves. Accordingly, corresponding AAOIs collected over time and superimposed may represent a ridge rather than an isolated stack or peak. In such contexts, additional or alternative criteria may be employed to determine whether to include a given AAOI within a stack. For example, instead of considering overlap with the area of a primary frame, the system may consider the extent to which an AAOI overlaps with a path that is interpolated or extrapolated from the existing AAOIs in the frame. Similarly, when determining whether to create a new stack, motion attributes may be accounted for (e.g., whether a given AAOI is on a reasonably continuous path with respect to previously detected AAOIs, or instead is discontinuous in a manner that is inconsistent with physical motion).

As discussed above with respect to FIG. 17, in some embodiments, once the topological map is generated, it may be used to make decisions regarding the operation of the video system used to capture the image data. For example, in a videoconferencing system, it may be desirable to frame the view of videoconference participants so that all active participants are captured, while attempting to minimize how much of the scene surrounding the active participants appears in the displayed video image. But participants may enter or leave a room over time, and consequently, an appropriately framed view of videoconference participants at one point in time may no longer accurately reflect the participants at a later point in time. Accordingly, it may be desirable to occasionally adjust the zoom, pan, and/or tilt of the primary imaging camera to reframe the participants.

Figure 21:
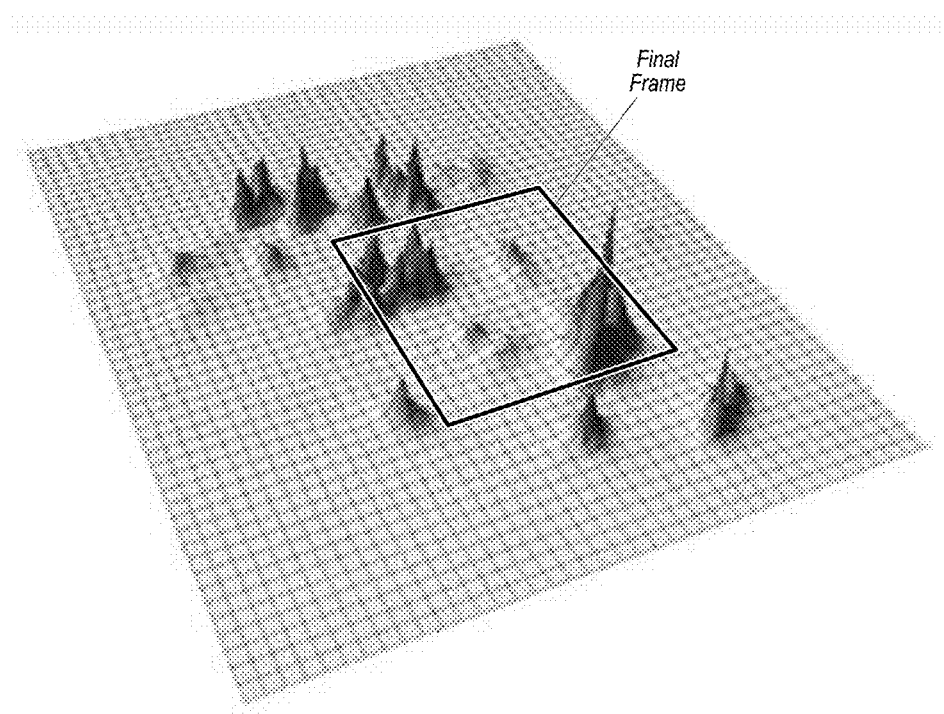
FIG. 21 illustrates an example of a hypothetical topological map that has been evaluated to determine how to frame a scene.

The topological map may be used to make such framing decisions. In some embodiments, framing information for a primary imaging camera may be determined by evaluating the topological map to identify the smallest two-dimensional region that maximizes the density of peaks of the topological map that are contained by that two-dimensional region. The resulting region may then be used to reframe the primary imaging camera (i.e., such that the primary imaging camera captures only the approximate area of the video space corresponding to the identified region). FIG. 21 illustrates one example of a hypothetical topological map that has been evaluated to determine how to frame a scene. Once the two-dimensional region has been identified, appropriate commands may be directed to the primary imaging camera to cause it to reframe the scene accordingly.

It is noted that during this process, different areas of the topological map may be weighted differently. For example, regions towards the center of the topological map (which may be more likely to contain participants) may be weighted more heavily than regions at the edges of the map (which may be more likely to correspond to peripheral areas of a room, such as walls, ceilings, doors, windows, etc.). In some embodiments, this weighting may be implemented by applying a high-pass filter to the topological map before identifying the framing region, thereby eliminating peaks that do not satisfy a threshold for inclusion in the framing decision. Alternatively, different weights may be applied to the different regions without first performing filtering.

The topological map may also have applications beyond framing. In some embodiments, it may be employed as part of a feature detection process. For example, in a videoconference context, it may be assumed that the majority of videoconferences have an upper bound on length (e.g., on the order of 1-2 hours). If a peak persists in the topological map for longer than this upper bound, then it is likely that the peak corresponds to a room fixture (e.g., a fan) rather than a conference participant. Once identified, this information can be used in future processing (e.g., to label or otherwise disregard the region of the identified peak as unlikely to be of interest).

Moreover, while the use of peaks of the topological map has been described above, other applications may instead be directed to identifying valleys or gaps between peaks. That is, the inverse of the topological map may be useful for certain applications (e.g., in attempting to identify interstitial regions between objects or areas of motion).

It is noted that any of the preceding methods or techniques may be implemented either in custom-designed hardware or via instructions stored on a computer-readable medium and executable by a processor, such as a general-purpose CPU or a graphics processing unit (GPU). For example, the dynamic calibration process and topological map discussed above may be implemented as part of an embedded, self-contained videoconferencing endpoint, as part of a general-purpose computer system coupled to one or more cameras, or using any combination of embedded and general-purpose hardware.

In the preceding description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described here. It will be appreciated that for simplicity and clarity of illustration, elements shown in the figures have not necessarily been drawn to scale. For example, the dimensions of some of the elements may be exaggerated relative to other elements.

This specification includes references to "an embodiment." The appearance of the phrase "in an embodiment" in different contexts does not necessarily refer to the same embodiment. Particular features, structures, or characteristics may be combined in any suitable manner consistent with this disclosure. Furthermore, as used throughout this application, the word "may" is used in a permissive sense (i.e., meaning "having the potential to"), rather than the mandatory sense (i.e., meaning "must"). Similarly, the words "include," "including," and "includes" mean including, but not limited to.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A system comprising a processor . . . ." Such a claim does not foreclose the system from including additional components (e.g., a display, a memory controller).

"Configured To." Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f) for that unit/circuit/component. Additionally, "configured to" can include generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that are adapted to implement one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B. "Dependent on" may be employed as a synonym for "based on."

"In Response To." As used herein, this term is used to describe causality of events or conditions. For example, in the phrase "B occurs in response to A," there is a cause-and-effect relationship in which A causes B to occur. It is noted that this phrase does not entail that A is the only event that causes B to occur; B may also occur in response to other events or conditions that may be independent of or dependent on A. Moreover, this phrase does not foreclose the possibility that other events or conditions may also be required to cause B to occur. For example, in some instances, A alone may be sufficient to cause B to happen, whereas in other instances, A may be a necessary condition, but not a sufficient one (such as in the case that "B occurs in response to A and C").

"Each." With respect to a plurality or set of elements, the term "each" may be used to ascribe some characteristic to all the members of that plurality or set. But absent language to the contrary, use of "each" does not foreclose the possibility that other instances of the element might not include the characteristic. For example, in the phrase "a plurality of widgets, each of which exhibits property A," there must be at least two (and possibly arbitrarily many) widgets that exhibit property A. But without more, this does not foreclose the possibility of an additional widget, not a member of the plurality, that does not exhibit property A. In other words, absent language to the contrary, the term "each" does not refer to every possible instance of an element, but rather every element in a particular plurality or set.

It is noted that some or all of the techniques described above may be implemented as instructions stored on a computer-readable medium that are executable (e.g., by a processor) to perform various operations. Example embodiments of a computer-readable medium include storage devices such as hard drives, optical drives, nonvolatile ("flash") storage, system memory, or the like, but exclude "transmission media" such as propagating waves.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A videoconferencing system, comprising:
   a sensor configured to capture sequential frames of video image data during a videoconference; and
   a processing subsystem configured to:
      for a given frame of the sequential frames of video image data, apply one or more filters to individual pixels of the given frame to identify one or more pixels of interest within the given frame, wherein the one or more filters include a motion detection filter;
      apply a multidimensional filter to the one or more pixels of interest, the multidimensional filter specifying one or more programmable density thresholds;
      designate at least one group of pixels of interest that satisfies the one or more programmable density thresholds as an active area of interest; and
      control an aspect of the videoconference based at least in part upon the active area of interest.

2. The videoconferencing system of claim 1, further comprising a camera, and wherein to control the aspect of the videoconference, the processing subsystem is further configured to adjust framing of the videoconference within the camera.

3. The videoconferencing system of claim 2, wherein the camera is a main view camera configured to perform one or more of pan, tilt, or zoom operations under control of the processing subsystem, and wherein the videoconferencing system further comprises a framing camera within which the sensor is housed.

4. The videoconferencing system of claim 1, wherein the one or more filters to identify one or more pixels of interest further include one or more of: a skin-tone detection filter, a color detection filter, an intensity filter, or any combination thereof.

5. The videoconferencing system of claim 1, wherein the multidimensional filter includes a two-dimensional running-sum low pass filter.

6. The videoconferencing system of claim 1, wherein to designate at least one group of pixels of interest as an active area of interest, the processing subsystem is further configured to generate a plurality of bounding coordinates of the active area of interest within the given frame.

7. The videoconferencing system of claim 6, wherein the processing subsystem is further configured to generate respective pluralities of bounding coordinates for multiple active areas of interest identified within the given frame, and is further configured to generate a plurality of bounding coordinates of a global active area of interest that encompasses the multiple active areas of interest.

8. The videoconferencing system of claim 1, wherein the processing subsystem includes a special-purpose video processing circuit comprising an image processing pipeline that is configured to implement the one or more filters and the multidimensional filter in hardware.

9. The videoconferencing system of claim 1, wherein the processing subsystem includes a general-purpose processor or a graphics processor that implements an instruction set architecture (ISA), wherein the general-purpose processor or graphics processor is configured to implement the one or more filters and the multidimensional filter by executing instructions selected from the ISA.

10. The videoconferencing system of claim 1, wherein to identify one or more pixels of interest within the given frame, the processing subsystem is further configured to perform multiple iterations over the given frame, wherein different iterations apply different combinations or configurations of the one or more filters.

11. The videoconferencing system of claim 1, wherein to identify one or more pixels of interest within the given frame, the processing subsystem is further configured to employ data derived from one or more frames that are prior in time to the given frame.

12. The videoconferencing system of claim 1, wherein to apply the multidimensional filter, the processing subsystem is further configured to perform multiple iterations over the given frame, wherein different iterations apply different sizes of the multidimensional filter.

13. An integrated circuit, comprising:
an input circuit configured to receive digitized frames of video data, wherein a given one of the frames comprises a two-dimensional array of pixels;
a processing pipeline configured to operate on the frames of video data, the processing pipeline comprising:
   a pixel-level filter circuit configured to apply one or more filters to individual pixels of the given frame to identify one or more pixels of interest within the given frame, wherein the one or more filters include a motion detection filter;
   a two-dimensional low pass filter circuit configured to identify pixels of interest that satisfy one or more programmable density thresholds; and
   an edge detection circuit configured to generate coordinates of an active area of interest within the given frame, wherein the active area of interest bounds the pixels of interest that satisfy the one or more programmable density thresholds.

14. The integrated circuit of claim 13, wherein the processing pipeline is configured to store a count of pixels of interest within a two-dimensional matrix comprising a plurality of matrix elements organized into rows and columns, wherein a given one of the matrix elements corresponds to a sub-area of the given frame, and wherein the given matrix element stores a count of pixels of interest identified in the sub-area of the given frame.

15. The integrated circuit of claim 13, wherein the two-dimensional low pass filter circuit comprises a horizontal running-sum low pass filter having a programmable horizontal threshold and a vertical running-sum low pass filter having a programmable vertical threshold.

16. The integrated circuit of claim 13, wherein the pixel-level filter circuit is further configured to apply the one or more filters to individual pixels of the given frame in multiple iterations, wherein different iterations employ different configurations of the one or more filters.

17. The integrated circuit of claim 13, wherein the two-dimensional low pass filter circuit is configured to perform multiple iterations using different filter sizes to identify the pixels of interest that satisfy the one or more programmable density thresholds.

18. A method of processing video data using active areas of interest, comprising:
   capturing sequential frames of video image data;
   for a given frame of the sequential frames of video image data, apply one or more filters to individual pixels of the given frame to identify one or more pixels of interest within the given frame, wherein the one or more filters include a motion detection filter;
   applying a multidimensional filter to the one or more pixels of interest, where the multidimensional filter specifies one or more programmable density thresholds;
   designating at least one group of pixels that satisfies the one or more programmable density thresholds as an active area of interest; and
   modifying presentation of the video image data based at least in part upon the active area of interest.

19. The method of claim 18, wherein the video image data corresponds to a videoconference, and wherein modifying presentation of the video image data comprises adjusting framing of the videoconference within a camera based at least in part upon the active area of interest.

20. The method of claim 18, wherein modifying presentation of the video image data comprises visually identifying the active area of interest within the video image data.

* * * * *